(12) United States Patent
Poulos et al.

(10) Patent No.: US 9,563,331 B2
(45) Date of Patent: Feb. 7, 2017

(54) WEB-LIKE HIERARCHICAL MENU DISPLAY CONFIGURATION FOR A NEAR-EYE DISPLAY

(71) Applicant: MICROSOFT TECHNOLOGY LICENSING, LLC, Redmond, WA (US)

(72) Inventors: Adam G. Poulos, Redmond, WA (US); Anthony J. Ambrus, Seattle, WA (US); Cameron G. Brown, Redmond, WA (US); Jason Scott, Kirkland, WA (US); Brian J. Mount, Seattle, WA (US); Daniel J. McCulloch, Kirkland, WA (US); John Bevis, Seattle, WA (US); Wei Zhang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 13/930,379

(22) Filed: Jun. 28, 2013

(65) Prior Publication Data

US 2015/0007114 A1    Jan. 1, 2015

(51) Int. Cl.
G06F 3/0482    (2013.01)
G06F 3/0481    (2013.01)
G06F 3/01    (2006.01)

(52) U.S. Cl.
CPC .............. *G06F 3/0482* (2013.01); *G06F 3/012* (2013.01); *G06F 3/04815* (2013.01)

(58) Field of Classification Search
CPC ................................. G06F 3/012; G06F 3/013
(Continued)

(56) References Cited

U.S. PATENT DOCUMENTS 6,128,010 A    10/2000    Baxter et al.
6,160,536 A    12/2000    Forest
(Continued)

FOREIGN PATENT DOCUMENTS

EP    2469397 A1    6/2012
JP    2012233963 A    11/2012
(Continued)

OTHER PUBLICATIONS

Provisional U.S. Appl. No. 61/768,485 of instant U.S. Appl. No. 13/930,379.*

(Continued)

*Primary Examiner* — Matt Kim
*Assistant Examiner* — David Luu
(74) *Attorney, Agent, or Firm* — Brianna Hinojosa; Judy Yee; Micky Minhas

(57) ABSTRACT

Technology is described for web-like hierarchical menu interface which displays a menu in a web-like hierarchical menu display configuration in a near-eye display (NED). The web-like hierarchical menu display configuration links menu levels and menu items within a menu level with flexible spatial dimensions for menu elements. One or more processors executing the interface select a web-like hierarchical menu display configuration based on the available menu space and user head view direction determined from a 3D mapping of the NED field of view data and stored user head comfort rules. Activation parameters in menu item selection criteria are adjusted to be user specific based on user head motion data tracked based on data from one or more sensors when the user wears the NED. Menu display layout may be triggered by changes in head view direction of the user and available menu space about the user's head.

20 Claims, 15 Drawing Sheets

(58) Field of Classification Search
USPC .......................................................... 715/852
See application file for complete search history.

(56) References Cited

U.S. PATENT DOCUMENTS

| | | | |
|---|---|---|---|
| 6,211,848 B1 | 4/2001 | Plesniak et al. | |
| 6,603,443 B1 | 8/2003 | Hildebrand et al. | |
| 6,847,336 B1 | 1/2005 | Lemelson et al. | |
| 7,583,252 B2 | 9/2009 | Kurtenbach et al. | |
| 2003/0085931 A1* | 5/2003 | Card et al. .................... | 345/853 |
| 2003/0210227 A1* | 11/2003 | Smith .................... | G06F 3/012 345/157 |
| 2004/0233171 A1 | 11/2004 | Bell et al. | |
| 2009/0112469 A1* | 4/2009 | Lapidot .................. | G01C 23/00 701/469 |
| 2009/0172603 A1* | 7/2009 | Young Suk Lee ............ | 715/854 |
| 2009/0265448 A1* | 10/2009 | Endler .................. | G06F 3/0482 709/219 |
| 2010/0058227 A1* | 3/2010 | Danton et al. ................ | 715/786 |
| 2010/0217834 A1* | 8/2010 | Woodcock ............. | H04L 12/00 709/218 |
| 2011/0202866 A1* | 8/2011 | Huang .................. | G06F 3/0482 715/779 |
| 2012/0005624 A1 | 1/2012 | Vesely | |
| 2012/0039505 A1* | 2/2012 | Bastide et al. ................ | 382/103 |
| 2012/0154277 A1* | 6/2012 | Bar-Zeev et al. ............. | 345/158 |
| 2012/0287040 A1 | 11/2012 | Moore et al. | |
| 2012/0317484 A1* | 12/2012 | Gomez et al. ................ | 715/716 |
| 2013/0139082 A1 | 5/2013 | Wheeler et al. | |
| 2013/0147836 A1 | 6/2013 | Small et al. | |
| 2013/0246967 A1* | 9/2013 | Wheeler et al. .............. | 715/784 |
| 2013/0285884 A1* | 10/2013 | Yamamoto et al. .............. | 345/8 |
| 2013/0293468 A1* | 11/2013 | Perez et al. .................... | 345/158 |
| 2013/0328927 A1* | 12/2013 | Mount et al. ................. | 345/633 |
| 2013/0335301 A1* | 12/2013 | Wong ................. | G02B 27/0093 345/8 |
| 2014/0040834 A1* | 2/2014 | Thompson ............ | G06F 3/0481 715/856 |
| 2014/0101608 A1* | 4/2014 | Ryskamp et al. ............. | 715/810 |
| 2014/0250371 A1* | 9/2014 | Wabyick ................. | G06F 17/21 715/243 |

FOREIGN PATENT DOCUMENTS

| | | |
|---|---|---|
| WO | 2013049248 A2 | 4/2013 |
| WO | 2013053466 A2 | 4/2013 |

OTHER PUBLICATIONS

International Search Report and Written Opinion Issued in PCT Application No. PCT/US2014/044089, Mailed Date: Dec. 11, 2014, 22 pages.

Balakrishnan, et al., "User Interfaces for Volumetric Displays", In Proceedings of IEEE Computer, vol. 34, Issue 3, Mar. 2011, 9 pages.

Janis, Sean Patrick, "Interactive Natural User Interfaces", In Master Thesis, Rochester Institute of Technology, May 2010, 116 pages.

International Preliminary Report on Patentability dated Sep. 7, 2015, in International Patent Application No. PCT/US2014/044089, 6 pages.

Response to Written Opinion filed Jun. 24, 2015 in International Patent Application No. PCT/US2014/044089, 14 pages.

* cited by examiner

WEB-LIKE HIERARCHICAL MENU DISPLAY CONFIGURATION FOR A NEAR-EYE DISPLAY

BACKGROUND

Traditional computer user input methods involve physical control devices such as a smartphone touchscreen, a gamepad, or a remote control for a gaming system. These devices are familiar and comfortable to users, and do provide a precise input reading. However, physical input devices can also be inconvenient. Users may need to retrieve a device from their pocket or bag before it is usable. In addition, physical input devices may not be usable when out-of-view, resulting in a user occasionally having to interrupt their activity to look at the device.

A near-eye display (NED) device, such as a head mounted display (HMD) device, may be worn by a user for an augmented reality (AR) experience or a virtual reality (VR) experience. Natural user input such as gaze action, speech and hand gestures allow users to interact with virtual objects in a three dimensional space around the user. However natural user input presents challenges in verifying selection of an item, adjusting for physical characteristics of a user, and having real world locations as a display space as opposed to predetermined electronic display spaces of known dimensions.

SUMMARY

The technology provides one or more embodiments of a web-like hierarchical menu interface for a near-eye display (NED) system. The interface comprises stored data representing one or more web-like hierarchical menu display configurations. When executing on one or more processors, an embodiment of the web-like hierarchical menu interface selects and adapts a display configuration for display in the user's three dimensional environment and for the user's head comfort based on monitoring sensor data from one or more sensors of the NED system when worn by a user. The sensors may also include image capture devices. The interface also identifies user interactions with a displayed menu based on the sensor data. In many embodiments, the web-like hierarchical menu interface provides a hands-free user interface.

The technology provides one or more embodiments of a method determining a web-like hierarchical display configuration for displaying a menu by a near-eye display (NED). An embodiment of the method comprises identifying by one or more processors data indicating a menu is to be displayed by the near-eye display (NED). An available menu space about a user head and a user head view direction are determined by the one or more processors based on a stored three dimensional (3D) mapping of an environment of the user. One or more processors select a position for the menu in a display field of view of the NED based on the user head view direction of a menu activation location.

A web-like hierarchical menu display configuration is selected based on the available menu space, the user head view direction and user head comfort rules. The one or more processors adapt menu items to the selected web-like hierarchical display configuration based on the available menu space, the user head view direction and user head comfort rules. The one or more processors cause the near-eye display to display the menu with its menu items adapted in accordance with the selected web-like hierarchical menu display configuration.

The technology provides one or more embodiments of a method for adapting activation of a web-like hierarchical menu interface being executed by one or more processors of a near-eye display (NED) system based on user selection metrics. An embodiment of the method comprises adjusting by one or more processors activation parameters in menu item selection criteria for the web-like hierarchical menu interface based on stored user head motion data. Head view direction of the user is monitored for determining whether a change in the head view direction activates a change in a menu display layout. Additionally, it is determined whether a change in the available menu space activates a change in the menu display layout. User selection of a menu item is identified, and feedback confirming user selection of the menu item is displayed by the NED under control of the one or more processors.

The technology provides one or more embodiments of a system for a near-eye display (NED) system for displaying a menu in a web-like hierarchical menu display configuration. An embodiment of the system comprises a near-eye support structure, and a near-eye display (NED) supported by the near-eye support structure and having a field of view. An image generation unit supported by the near-eye support structure outputs image data, like a menu in a web-like hierarchical menu display configuration, for display by the near-eye display (NED).

One or more processors have access to a memory storing web-like hierarchical menu display configurations and web-like hierarchical menu display configurations rules. Being communicatively coupled to the image generation unit, the one or more processors control display of a menu in accordance with one of the stored web-like hierarchical menu display configurations and user head comfort rules.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
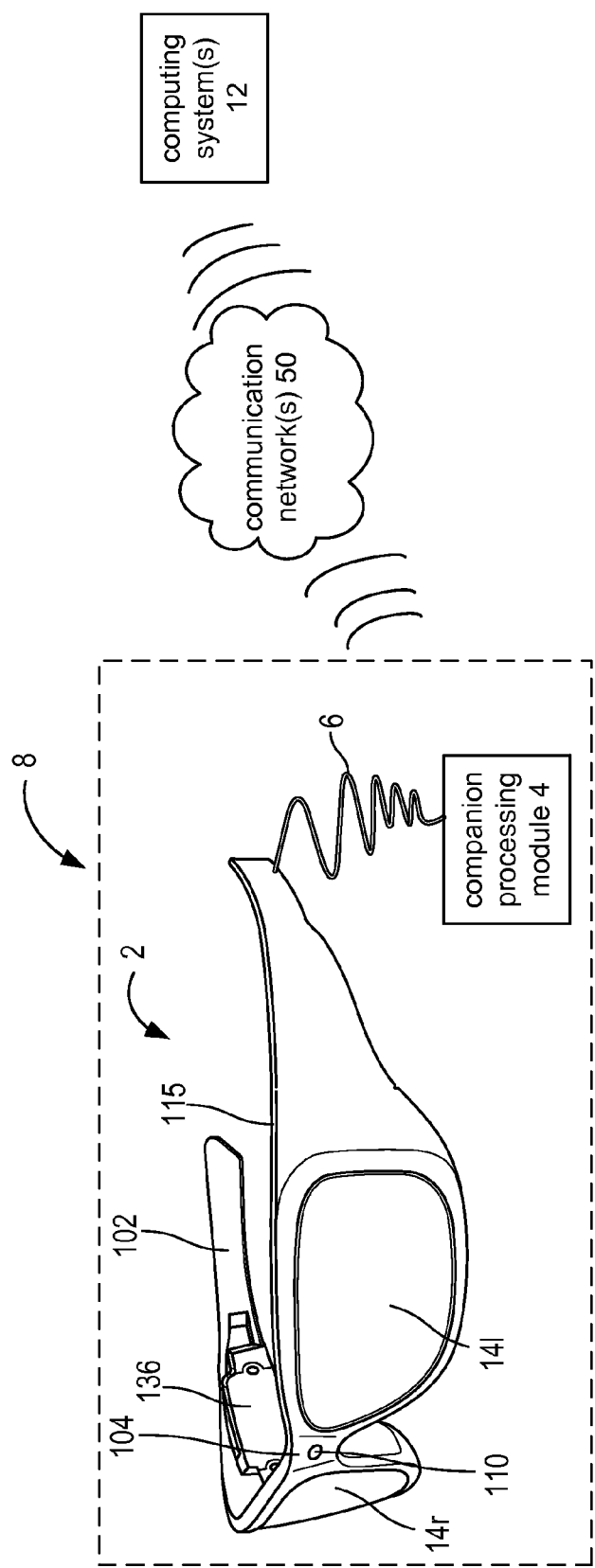
FIG. 1 is a block diagram depicting example components of one embodiment of a near-eye display (NED) device system.

In an augmented reality or virtual reality environment, menus may be associated with menu activation locations which are positions in a user 3D environment, tethered to real or virtual objects in the user environment, body locked to a user, and even head locked to a user. An example of an event triggering display of a menu is detection of a user perspective or head view direction including one of these menu activation locations. In other words, detection of the menu activation location in a field of view of the near-eye display. For example, when a user looks at the body locked position associated with the menu or a real or virtual object associated with the menu, a menu may be displayed or pop up for the user. In some instances, a cursor appears near the menu activation location in the field of view.

One or more embodiments of a web-like hierarchical menu display configuration links menu levels and menu items within a menu level with flexible spatial dimensions for menu elements. An embodiment of a web-like hierarchical menu interface selects and adapts the configuration to display a menu hierarchy with a goal of maintaining user head comfort for a wearer of a near-eye display (NED) device. In fact, besides distances between menu items, many aspects of a web-like hierarchical menu display configuration can be defined to be flexible, as governed by rules associated with the configuration, such as size and shape of menu item, number of levels displayable simultaneously, shape variation of flexible links, angle separation between menu items and the like.

A configuration is web-like in the sense of a spider's web. The configurations are analogous in that they can be of varying overall size, and include portions which are more compact than others depending on the space available for their display like natural spider webs are based on the spaces in which they are woven.

In many examples, natural user input in terms of user head view direction and change in user head position can be used to select a menu item. For example, user focus on a menu item may be identified by head view direction, which is from which angle a user is viewing a scene. The menu item may be highlighted or otherwise visually indicated to be a selection candidate, and the user wearing the NED system can perform a confirmatory action with his or her head like a nod as a change in head position, or a side to side change in head position traversing the menu item, sometimes referred to as a head swipe while the user head view direction stays within a range with respect to the menu item. (One or more sensors on the NED will detect the head swipe.) Head based movements can be determined from an inertial sensing unit including an accelerometer which is a less costly sensor package than an eye tracking system in terms of power.

Some embodiments of the web-like hierarchical menu interface provide hands-free interaction with a menu. This allows the user to keep performing everyday activities with their hands and use their head to navigate the virtual menu. Additionally, gesture recognition, if available, can be computationally expensive. An application may already be using gesture recognition resources for identifying hand and finger gestures as user input related to an activity being provided by the application. Other embodiments may also recognize gaze based actions and speech as user actions for selecting an item. For example, gaze and speech may be fallback user selection actions if selection resolution issues arise based on head position or head movement. As mentioned above, gaze detection uses additional hardware and processor time for tracking eye movements and tracking gaze changes. Sound or voice input may be distracting, if not to the user, to others in the environment and may also reduce privacy.

FIG. 1 is a block diagram depicting example components of one embodiment of a near-eye display (NED) device system. In the illustrated embodiment, the system includes a near-eye display (NED) device as a head mounted display (HMD) device 2 and communicatively coupled via a wire 6 to another computer system identified as a companion processing module 4. In other embodiments, wireless communication between the NED device 2 and a companion processing module 4 may be used. In other embodiments, the functionality of the companion processing module 4 may be integrated in software and hardware components of the display device 2.

In these embodiments, NED device 2 is in the shape of eyeglasses in a frame 115, with a respective display optical system 14 positioned at the front of the NED device to be seen through by each eye when the NED is worn by a user. In this embodiment, each display optical system 14 uses a projection display in which image data is projected into a user's eye to generate a display of the image data so that the image data appears to the user at a location in a three dimensional field of view in front of the user. Each display optical system 14 is also referred to as a display, and the two display optical systems 14 together may also be referred to as a display.

In these embodiments, frame 115 provides a convenient eyeglass frame as a near-eye support structure for holding elements of the NED device 2 in place as well as a conduit for electrical connections. The frame 115 includes a nose bridge 104 with a microphone 110 for recording sounds and transmitting audio data to control circuitry 136. A temple or side arm 102 of the frame rests on each of a user's ears, and in this example, the right side arm 102r is illustrated as including control circuitry 136 for the NED device 2.

In some embodiments, companion processing module 4 is a portable computer system like a mobile device (e.g. smartphone, tablet, laptop). One or both of the NED device and the companion processing module 4 may communicate over one or more communication networks 50 to one or more network accessible computer systems 12, whether located nearby or at a remote location.

An application may be executing on a computer system 12 which interacts with or performs processing for an application executing on one or more processors in the near-eye display device system 8. For example, a 3D mapping application may be executing on the one or more computers systems 12, and the user's near-eye display device system 8 communicates image and depth data from image sensors as other sensor data like inertial sensor data which the one or more computer systems 12 use for building a detailed 3D mapping of the user's environment. The NED system 8 can then download the detailed 3D mapping for identifying what a user is looking at and where to display image data representing virtual objects the field of view of the display. The term "display field of view" refers to a field of view of a display of the NED device system. In other words, the display field of view approximates a user field of view as seen from a user perspective also referred to as a user head view direction.

Figure 2A:
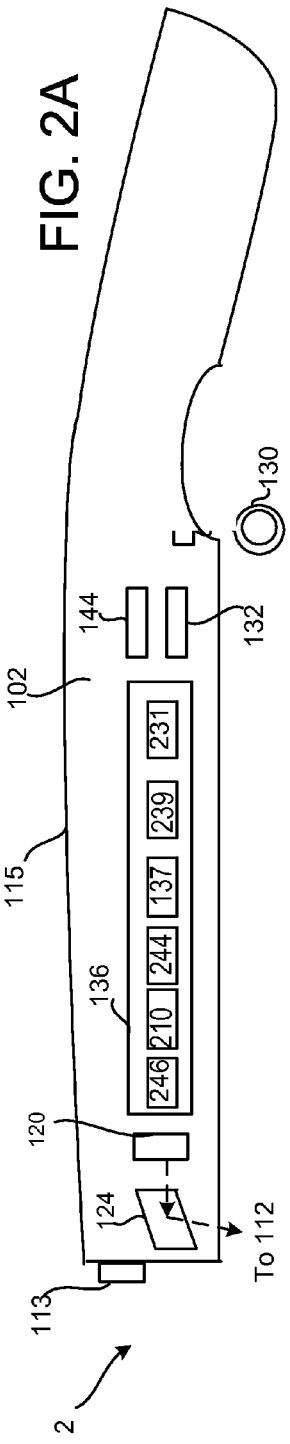
FIG. 2A is a side view of an eyeglass temple of a frame in an embodiment of the NED device having an optical see-through AR display, and the NED device being embodied as eyeglasses providing support for hardware and software components.

FIG. 2A is a side view of an eyeglass temple 102r of a frame in an embodiment of the NED device having an optical see-through display. At the front of frame 115 id depicted one of at least two depth image capture devices 113, e.g. depth cameras, that can capture image data like video and still images, typically in color, of the real world as well as depth sensor data. The depth sensor data may be captured by depth sensitive pixels which correspond to pixels on an image sensor in the depth camera 113. The capture devices 113 are also referred to as outward facing capture devices meaning facing outward from the user's head.

The illustrated capture device is a front facing capture device which is calibrated with respect to a reference point of its respective display optical system 14. One example of such a reference point is an optical axis (see 142 in FIG. 2B) of its respective display optical system 14. The calibration allows the display field of view of the display optical systems 14 to be determined from the depth image data captured by the capture devices 113. The depth data and image data form a depth map of the captured field of view of the depth image capture devices 113 which are calibrated to include the display field of view. A three dimensional (3D) mapping of a display field of view can be generated based on the depth map, and the 3D mapping is used to identify a user head view direction and where to display image data representing virtual objects for the user wearing the NED device 2 to see.

Control circuitry 136 provides various electronics that support the other components of head mounted display device 2. In this example, the right side arm 102r illustrates exemplary components of control circuitry 136 for the display device 2. The exemplary components include a display driver 246 for an image generation unit 120. For example, the display driver 246 may provide control signals to microdisplay circuitry and drive current to an illumination source for the microdisplay. Other exemplary components includes a processing unit 210 which controls the display driver 246, a memory 244 accessible to the processing unit 210 for storing processor readable instructions and data, a communication module 137 communicatively coupled to the processing unit 210, sensor/speaker interface circuitry 231, and a power supply 239 providing power for the components of the control circuitry 136 and the other components of the display device 2 like the capture devices 113, the microphone 110 and the sensor units discussed below. The interface circuitry 231 performs analog to digital conversion, if necessary, for sensor readings such as from the inertial sensing unit 132 and the location sensing unit 144, and performs digital to analog conversion for audio output to the earphones 130. The interface circuitry 231 may also buffer sensor readings directly into memory 244 or transfer the sensor readings to processing unit 210.

The processing unit 210 may comprise one or more processors including a central processing unit (CPU) and a graphics processing unit (GPU), particularly in embodiments without a separate companion processing module 4 which contains at least one graphics processing unit (GPU).

Inside, or mounted to a side arm 102, are an earphone of a set of earphones 130 as an example of an audio output device, an inertial sensing unit 132 including one or more inertial sensors, and a location sensing unit 144 including one or more location or proximity sensors, some examples of which are a GPS transceiver, an infrared (IR) transceiver, or a radio frequency transceiver for processing RFID data. In one embodiment, inertial sensing unit 132 includes a three axis magnetometer, a three axis gyroscope, and a three axis accelerometer as inertial sensors. The inertial sensing unit 132 senses position, orientation, and sudden accelerations of NED device 2. From these sensed movements, head position, (also referred to as head orientation) and thus orientation of the display device, may also be determined which indicate changes in the user perspective, which is the user head view direction and the display field of view for which image data is updated to track with the user perspective.

In this embodiment, the image generation unit 120 can display a virtual object to appear at a designated depth location in a display field of view to provide a realistic, in-focus three dimensional display of a virtual object which can interact with one or more real objects. In some examples, rapid display of multiple images or a composite image of the in-focus portions of the images of virtual features may be used for causing the displayed virtual data to appear in different focal regions. In other examples, Z buffering may be used.

In the illustrated embodiment of FIG. 2A, the image generation unit 120 includes a microdisplay and coupling optics, like a lens system. In this example, image data output by the microdisplay is directed to a reflecting surface or element 124. The reflecting surface or element 124 optically couples the light from the image generation unit 120 into a display unit 112 (see FIG. 2B), which directs the light representing the image into a user's eye when the device 2 is worn by a user.

Figure 2B:
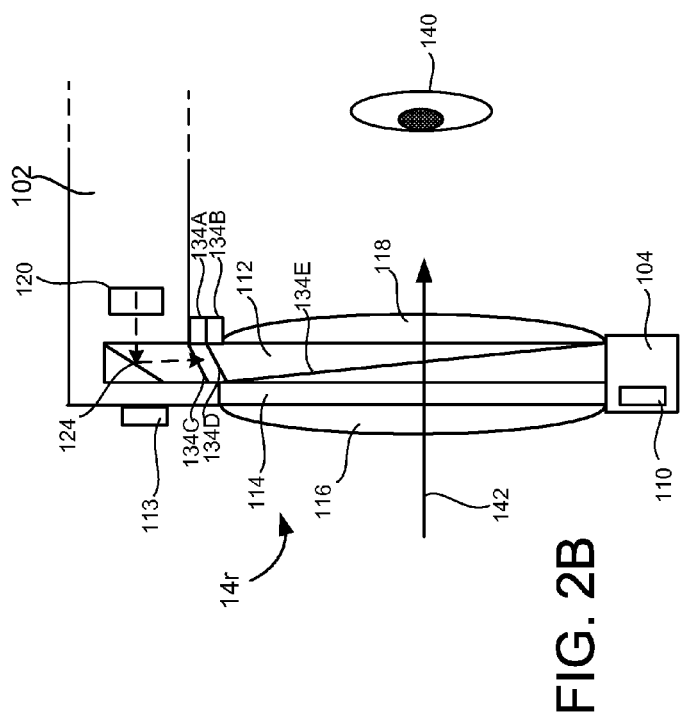
FIG. 2B is a top view of an embodiment of a display optical system of the embodiment of the NED device.

FIG. 2B is a top view of an embodiment of a display optical system of a NED device. In order to show the components of the display optical system 14, in this case 14r for the right eye, a portion of the frame 115 surrounding the display optical system is not depicted. In this embodiment, the displays 14l and 14r are optical see-through displays, and each display includes a display unit 112 illustrated between two optional see-through lenses 116 and 118 and including a representative reflecting element 134E representing the one or more optical elements like a half mirror, grating, and other optical elements which may be used for directing light from the image generation unit 120 towards a user eye area 140. Arrow 142 represents an optical axis of the display optical system 14r. An example of a display unit 112 for an optical see-through NED includes a light guide optical element. An example of a light guide optical element is a planar waveguide.

In this embodiment, the NED display 14r is an optical see-through, augmented reality display so that it may allow light from in front of the near-eye display (NED) device 2 to be received by a user eye, thereby allowing the user to have an actual direct view of the space in front of NED device 2 in addition to seeing an image of a virtual object from the image generation unit 120. However, the technology works with video-see displays as well.

In this embodiment, display unit 112 implements an integrated eye tracking and display system. Again, one or more applications may use eye tracking for the activities they provide for a user, even if the web-like hierarchical menu interface does not, or not as a primary interaction mechanism. For example, an infrared (IR) illumination source may be optically coupled into each display unit 112. The one or more optical elements which direct visible light towards the eye may also direct the IR illumination towards the eye and be bidirectional in the sense of being able to direct IR reflections from the eye to an IR sensor such as an IR camera. A pupil position may be identified for each eye from the respective IR sensor data captured, and based on a model of the eye, e.g. the Gullstrand eye model, and the pupil position, a gaze line for each eye may be determined by software extending from an approximated fovea position. A point of gaze in the display field of view can be identified. An object at the point of gaze may be identified as an object of focus.

In this embodiment, display unit 112 includes a planar waveguide which acts as part of the display and also integrates eye tracking. The representative reflecting element 134E represents the one or more optical elements like mirrors, gratings, and other optical elements which direct visible light representing an image from the planar waveguide towards the user eye 140. In this embodiment, representative reflecting element 134E also performs bidirectional reflection of infrared light as part of the eye tracking system. Infrared illumination and reflections, also traverse the planar waveguide for an eye tracking system 134 for tracking the position and movement of the user's eye, typically the user's pupil. Eye movements may also include blinks. The eye tracking system 134 comprises an eye tracking IR illumination source 134A (an infrared light emitting diode (LED) or a laser (e.g. VCSEL)) and an eye tracking IR sensor 134B (e.g. IR camera, arrangement of IR photodetectors). Wavelength selective filters 134C and 134D with representative reflecting element 134E implement bidirectional infrared (IR) filtering which directs IR illumination towards the eye 140, preferably centered about the optical axis 142 and receives IR reflections from the user eye 140, preferably including reflections captured about the optical axis 142, which are directed from the waveguide to an IR sensor 134B.

Again, FIGS. 2A and 2B show half of the head mounted display device 2. For the illustrated embodiment, a full head mounted display device 2 may include another display optical system 14 as well as another image generation unit 120, another of outward facing capture devices 113, eye tracking system 134, and another of the earphones 130.

Figure 3A:
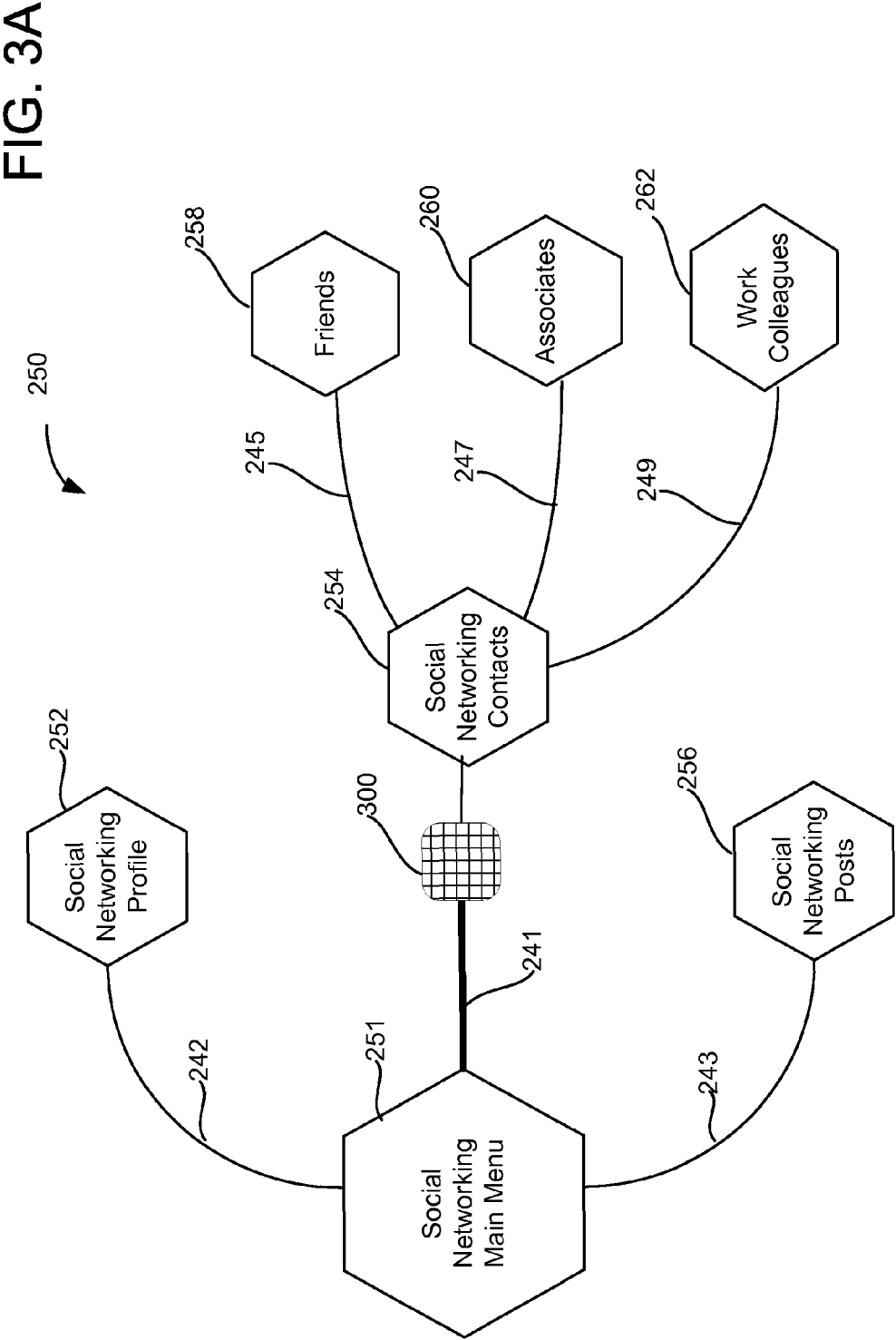
FIG. 3A illustrates an example of a web-like hierarchical display configuration with flexible links connecting levels of menu selections included in an embodiment of web-like hierarchical menu user interface.

FIG. 3A illustrates an example of a web-like hierarchical display configuration 250 with flexible links connecting levels of menu selections included in an embodiment of web-like hierarchical menu user interface. The menu displays two menu levels below a root 251 which is labeled "Social Networking Main Menu." In this example, display menu elements of flexible links 242, 241, and 243 link children nodes represented by visual elements of hexagons "Social Networking Profile" 252, "Social Networking Contacts" 254 and "Social Networking Posts" 256 respectively to the root 251. At a second menu level, display menu elements of flexible links 245, 247, and 249 link children nodes represented by visual elements of hexagons "Friends" 258, "Associates" 260 and "Work Colleagues" 262 respectively to their parent node "Social Networking Contacts 254." An application provides the content ("Friends", "Associates", "Social Networking Profile") for menu items and the tree hierarchy. A display configuration defines how they are represented by display menu elements on a display.

In this example configuration, the length and shape of the flexible links are adjustable. For example, the arc of the link may be adjusted within a range as well as the lengths. Adjustable links also indicate the positions of the menu elements may be repositioned as per constraints defined for the configuration as discussed below. Menu items may be holographic in their appearance, appearing as 3D objects. As discussed below, menu items may maneuver within a depth range as well even if the display menu element representing the menu item appears two dimensional.

FIG. 3A also illustrates a cursor 300 which may used as a visual aid identifying a user natural user input position within the menu or a navigation path within the menu configuration. For example, the cursor may move relational to a user head movement or gaze movement. To avoid a jumpy cursor, the cursor position changes may be smoothed and associated with a guide like a flexible link to show the user the progress they are making in a selection. In the illustrated example, the near-eye display under control of one or more processors of the NED system 8 may display cursor 300 movement along one of the flexible links 241 which is highlighted for indicating progress in selecting one of the menu items, for example with a user action like a head movement or a gaze action.

Figure 3B:
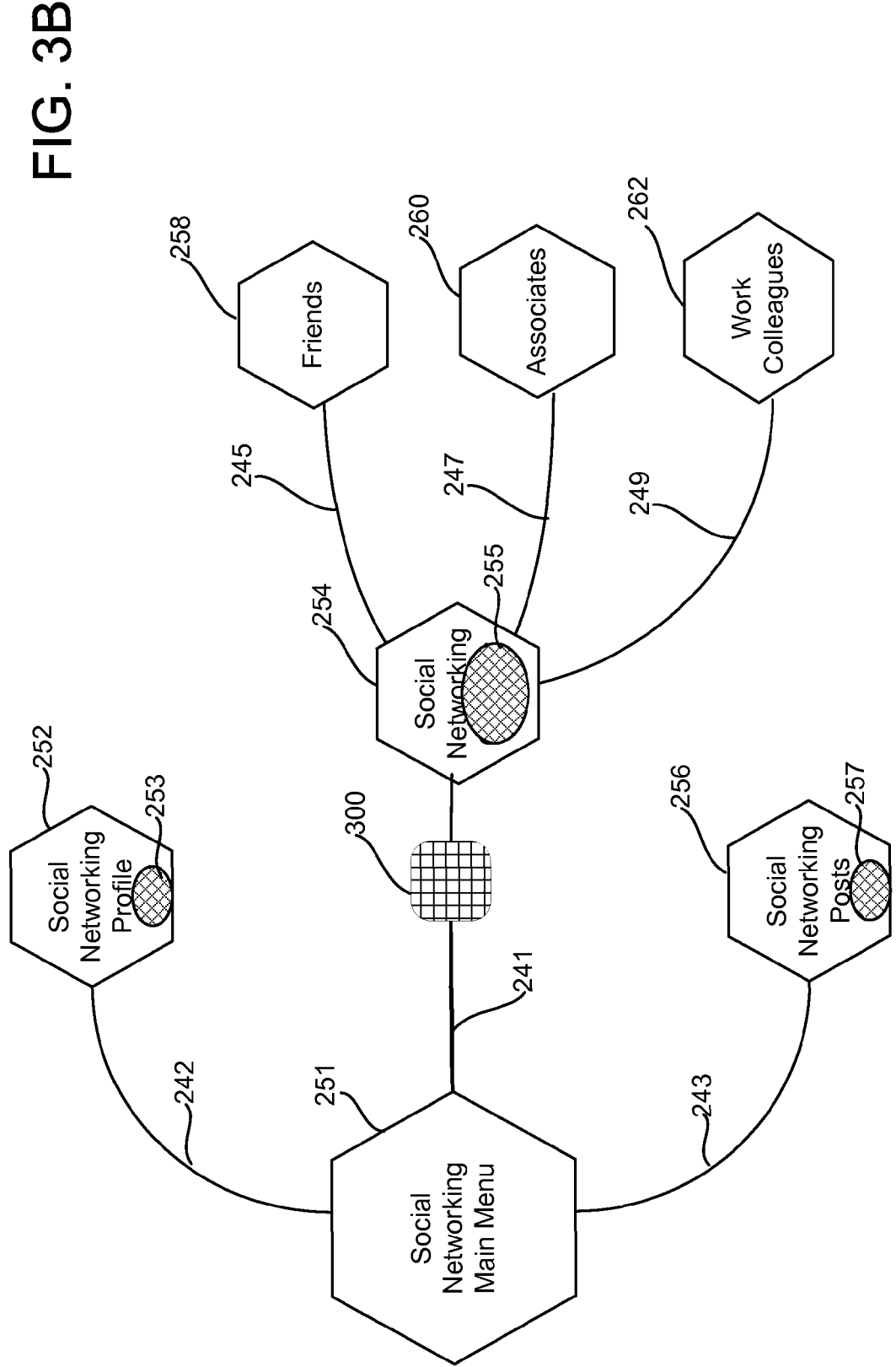
FIG. 3B illustrates another version of the example web-like hierarchical menu display configuration of FIG. 3A with an example of another visual aid for illustrating progress in making a menu selection.

FIG. 3B illustrates another version of the example web-like hierarchical menu display configuration of FIG. 3A with an example of another visual aid for illustrating progress in making a menu selection. The elliptical shapes 253, 255, and 257 are icons which grow or get bigger in relation to a user action indicating navigation or selection of the item. In this example, as the cursor 300 nears menu item 255, its icon 255 grows proportionally. An icon may change color or reach a maximum size (which may be scaled in relation to menu dimensions) indicating successful selection of a menu item, or be replaced by the cursor 300.

Based on a 3D mapping of a user environment or at least a field of view of the display, an amount of space for menu display is identified, referred to hereafter as available menu space, as well as a user head view direction or user perspective of the menu. As discussed further below, user head comfort rules or the amount of available menu space may trigger the menu to be reformatted to another display configuration, or menu elements in the current display to be reformatted. Some examples of reformatting or repositioning menu elements include adapting a size of menu items in at least one menu level displayed simultaneously, adapting a number of menu levels displayed simultaneously and changing a depth position of menu items based on their selection status. For example, user head view direction of a menu item may indicate a current user head position does not satisfy user head comfort rules. As permitted by configuration rules, currently unselected menu items are moved in a depth direction away from the NED in a display field of view of the NED and display locations of menu items of a currently user selected menu level are moved to a position in a 3D mapping of the user environment at which the user view direction can be from a center head position. A center head position is looking straight ahead without rotation of the head. Minimizing player rotation through careful UI placement is a benefit that reduces strain on a user's neck during interaction with the menu.

Figure 4B:
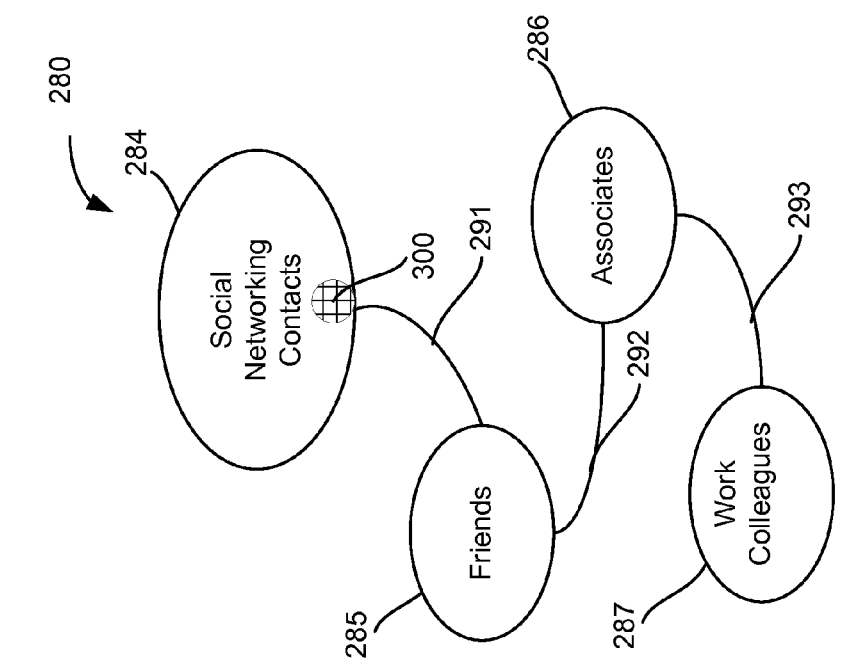
FIG. 4B illustrates another example of a web-like hierarchical menu display configuration with zig zag shaped flexible links connecting menu items.
Figure 4A:
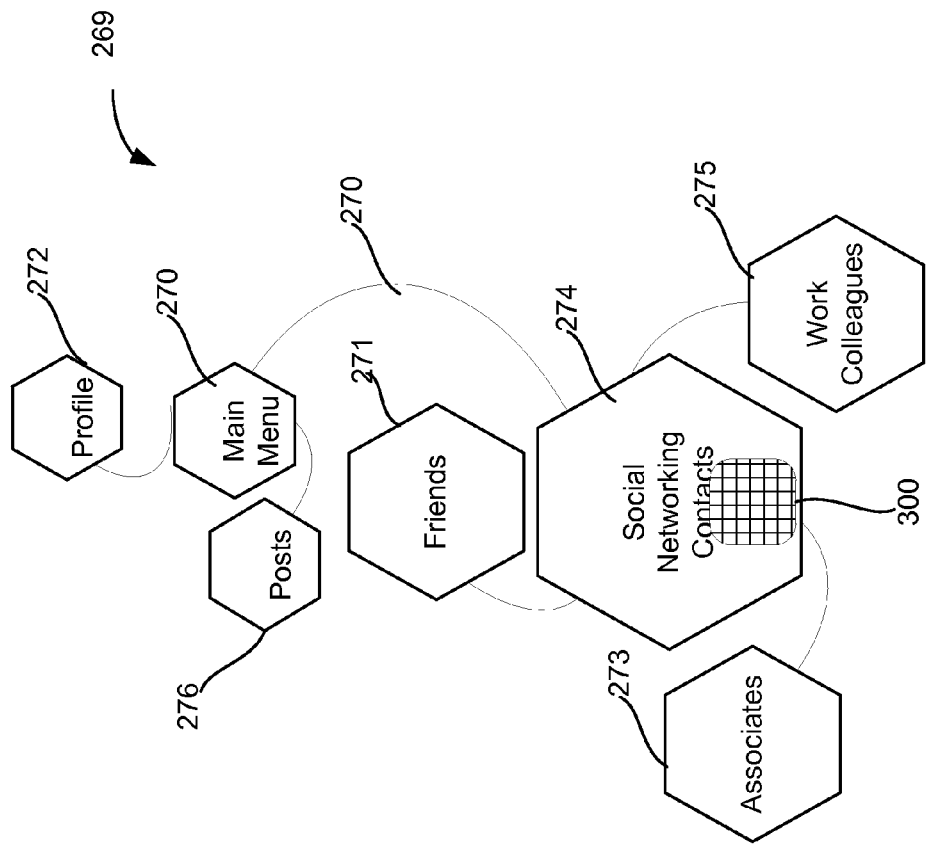
FIG. 4A illustrates another example of a web-like hierarchical menu display configuration with shape flexible links connecting levels of menu selections.

FIG. 4A illustrates another example of a web-like hierarchical menu display configuration with shape flexible links connecting levels of menu selections. This example illustrates a new display configuration 269. The hexagonal menu elements are again used to represent menu items, but due to available menu space, the menu items are closer together in an overall more horizontally compact display configuration. Only one representative flexible link 270 is labeled to avoid overcrowding the drawing.

As indicated by cursor 300, the currently selected item is Social Networking Contacts 274 in a second menu level and its children nodes Friends, 271, Associates 273 and Work Colleagues 275 are positioned around it. Over time, the selection of menu items in lower levels may cause the user to look down too long which is detected as a violation of user head comfort rules. However, the user may have a preference for leaving traversed menu levels open or a visual cue to them being visible. This configuration may reposition its elements by pushing the parent menu level for the node "Main Menu" 270 to a depth level further into the field of view so its menu elements of hexagonal icons 272, 270 and 276 and its links appear smaller. Even the content displayed for a menu item may be altered in reformatting as here where Social Networking has been removed prior to "Profile" "Main Menu" and "Posts".

FIG. 4B illustrates another example of a web-like hierarchical menu display configuration 280 with zig zag shaped flexible links 291, 292 and 293 connecting menu items Friends 285, Associates 286 and Work Colleagues 287 of a same menu level to their parent Social Networking Contacts 284 currently selected as indicated by the cursor 300. The available menu space may have been identified as having more space in a vertical direction than a horizontal direction with respect to the user head view direction, so web-like hierarchical menu interface display software may select this configuration to fit the space. The menu items may be adapted in the configuration 280 to show one level at a time to avoid exceeding up and down head rotation thresholds.

Figure 5A:
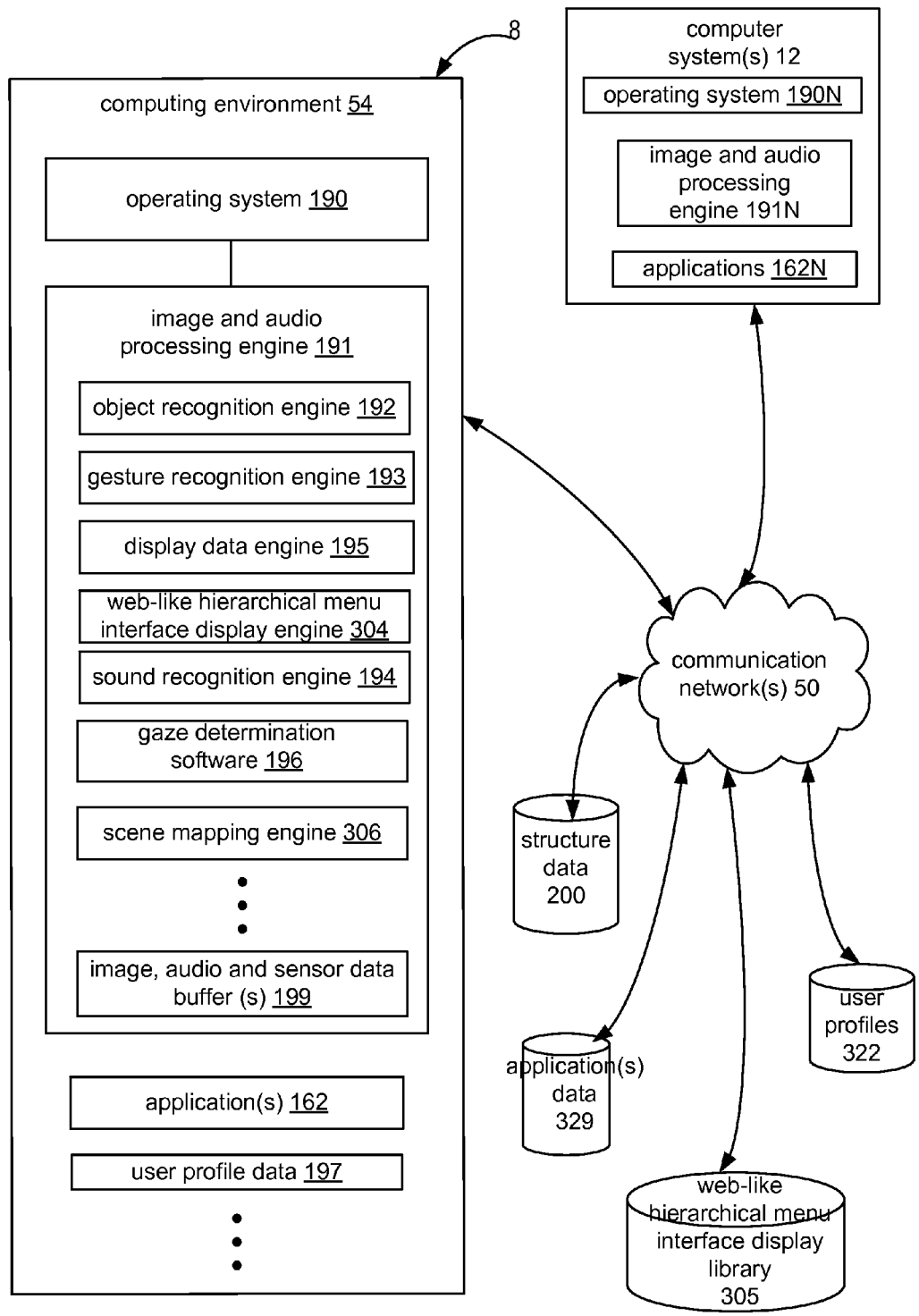
FIG. 5A is a block diagram of an embodiment of a system from a software perspective including a web-like hierarchical menu interface for operation within a near-eye display device.

FIG. 5A is a block diagram of an embodiment of a system from a software perspective including a web-like hierarchical menu interface for operation within a near-eye display device. FIG. 5A illustrates an embodiment of a computing environment 54 from a software perspective which may be implemented by a system like NED system 8, one or more remote computer systems 12 in communication with one or more NED systems or a combination of these. Additionally, a NED system can communicate with other NED systems for sharing data and processing resources.

As noted above, an executing application determines which hierarchical menu content is to be displayed, and in this embodiment, the menu content is adapted to a web-like hierarchical display configuration by a web-like hierarchical menu interface display engine 304. In this embodiment, an application 162 may be executing on one or more processors of the NED system 8 and communicating with an operating system 190 and an image and audio processing engine 191. In the illustrated embodiment, a remote computer system 12 may also be executing a version 162N of the application as well as other NED systems 8 with which it is in communication for enhancing the experience.

Application data 329 for one or more applications may also be stored in one or more network accessible locations. Some examples of application data 329 may be one or more rule datastores for rules linking action responses to user input data, rules for determining which image data to display responsive to user input data, reference data for natural user input like for one or more gestures associated with the application which may be registered with a gesture recognition engine 193, execution criteria for the one or more gestures, voice user input commands which may be registered with a sound recognition engine 194, physics models for virtual objects associated with the application which may be registered with an optional physics engine (not shown) of the image and audio processing engine 191, and object properties like color, shape, facial features, clothing, etc. of the virtual objects and virtual imagery in a scene.

As shown in the embodiment of FIG. 5A, the software components of a computing environment 54 comprise the image and audio processing engine 191 in communication with an operating system 190. The illustrated embodiment of an image and audio processing engine 191 includes an object recognition engine 192, gesture recognition engine 193, display data engine 195, a web-like hierarchical menu interface display engine 304, a sound recognition engine 194, gaze determination software 196 and a scene mapping engine 306. Additional functionality may be added as indicated by . . . . The individual engines and data stores provide a supporting platform of data and tasks which an application 162 can leverage for implementing its one or more functions by sending requests identifying data for processing and receiving notification of data updates. The operating system 190 facilitates communication between the various engines and applications. The operating system 190 makes available to applications which objects have been identified by the object recognition engine 192, gestures the gesture recognition engine 193 has identified, which words or sounds the sound recognition engine 194 has identified, and the positions of objects, real and virtual from the scene mapping engine 306.

The operating system 190 also makes available points of gaze and objects of focus in a display field of view identified by a processor executing the gaze determination software 196 based on eye tracking data like the IR image data received from the eye tracking system 134. Based on the eye tracking data and image and depth data captured by front facing capture devices 113, a point of gaze is determined by one of a variety of processes. In one example of determining gaze, the executing gaze determination software 196 identifies a pupil position within each eye and models a gaze line for each eye extending from an approximated location of a respective fovea. The one or more processors determine a position in the display field of view where the gaze lines meet. Based on a 3D mapping of objects in the display field of view (see discussion of scene mapping engine 306), an object at which the gaze lines meet is an object of focus.

The computing environment 54 also stores data in image, audio and sensor data buffer(s) 199 which provide memory for image data, and audio data which may be captured or received from various sources as well as memory space for image data to be displayed and audio data to be output. The buffers also provide memory for buffering sensor readings such as from sensors like a 3 axis accelerometer, a 3 axis gyroscope and a 3 axis magnetometer as may be embodied in inertial sensing unit 132. The buffers may exist on both the NED, e.g. as part of the overall memory 244, and may also exist on the companion processing module 4.

In many applications, virtual data is to be displayed in relation to a real object in the real environment. The object recognition engine 192 of the image and audio processing engine 191 detects and identifies real objects, their orientation, and their position in a display field of view based on captured image data and captured depth data from outward facing image capture devices 113 if available or determined depth positions from stereopsis based on the image data of the real environment captured by the capture devices 113. The object recognition engine 192 distinguishes real objects from each other by marking object boundaries, for example using edge detection, and comparing the object boundaries with structure data 200. Besides identifying the type of object, an orientation of an identified object may be detected based on the comparison with stored structure data 200. Accessible over one or more communication networks 50, structure data 200 may store structural information such as structural patterns for comparison and image data as references for pattern recognition. Reference image data and structural patterns may also be available in user profile data 197 stored locally or accessible in cloud based storage 322.

The scene mapping engine 306 tracks the three dimensional (3D) position, orientation, and movement of real and virtual objects in a 3D mapping of the display field of view where image data is to be displayed or in a 3D mapping of a volumetric space about the user based on communications with the object recognition engine 192 and one or more executing applications causing image data to be displayed like an application 162 or the web-like hierarchical menu interface display engine 304.

A depth map representing captured image data and depth data from outward facing capture devices 113 can be used as a 3D mapping of a display field of view of a near-eye display. The depth map has a view dependent coordinate system for the display field of view approximating a user perspective. The captured data may be time tracked based on capture time for tracking motion of real objects. Virtual object positions can be registered in the depth map.

Mapping what is around the user in the user's environment can be aided with sensor data. Data from an inertial sensing unit 132, e.g. a three axis accelerometer and a three axis magnetometer, determines position changes of the user's head and correlation of those head position changes with changes in the image and depth data from the outward facing capture devices 113 can identify positions of objects relative to one another and at what subset of an environment or location a user is looking. This subset of the environment is what is the scene in the display field of view from which a user perspective or user head view direction can be identified.

The scene mapping engine 306 can also use a view independent coordinate system for 3D mapping, and a copy of a scene mapping engine 306 may be in communication with other scene mapping engines 306 executing in other systems (e.g. 12, 20 and 8) so the mapping processing can be shared or controlled centrally by one computer system which shares the updated map with the other systems. Overlapping subject matter in the depth images taken from multiple perspectives may be correlated based on a view independent coordinate system and time, and the image content combined for creating the volumetric or 3D mapping (e.g. an x, y, z representation or a 3D mesh surface reconstruction model) of a location or environment (e.g. a room, a store space, or a geofenced area). Thus, changes in light, shadow and object positions can be tracked. The view independent map can be stored in a network accessible location accessible via a remote computer system 12.

A web-like hierarchical menu interface display software engine 304, based on data and rules, stored in a network (or local) accessible web-like hierarchical menu interface display library 305, determines a web-like hierarchical display configuration for a menu to be displayed for an application, adapts menu items within the configuration based on changes in available menu space about a user's head, and for head comfort in navigating the menu. Some factors affecting the available menu space about a user's head are other objects surrounding a user. For example, a user seated on a train may have the seat in front of him or her limiting his or her view. A user in a living room may have six feet or more of unobstructed distance between her position on the couch and a television. Menu placement criteria or rules may also indicate a preference of not obscuring an object with which a user may be interacting. For example, a user may be moving virtual or real objects in an activity related to the menu, so the menu does not cover the objects or only to an allowed percentage or has its transparency adjusted. In another example, a user's friend walks into the room and overlaps a same space as one of the menu items. In this scenario, the web-like hierarchical menu interface display software engine 304 adjusts the display configuration to avoid overlapping the user's friend, for example by moving the menu item.

The web-like hierarchical menu interface display engine 304 also identifies user selection of menu items in accordance with user-specific menu selection criteria and provides visual aids to give a user feedback on selection success. The web-like hierarchical menu interface display software engine 304 executing on one or more processors of the NED system 8, the network accessible computer system 12, or both may perform the method embodiments discussed below based on data and rules stored in its accessible library 305.

An application 162 or the web-like hierarchical menu interface display engine 304 identifies a target 3D space position in the 3D mapping of the display field of view for an object represented by image data and controlled by the application. For example, the web-like hierarchical menu interface display engine 304 identifies changes in the position and object properties of the display menu elements based on the user actions, or other changes triggering menu layout changes. The display data engine 195 performs translation, rotation, and scaling operations for display of the image data at the correct size and perspective. The display data engine 195 relates the target 3D space position in the display field of view to display coordinates of the display unit 112. For example, the display data engine may store image data for each separately addressable display location or area, e.g. a pixel, in a Z-buffer and a separate color buffer. The display driver 246 translates the image data for each display area to digital control data instructions for controlling the image generation unit 120.

Figure 5B:
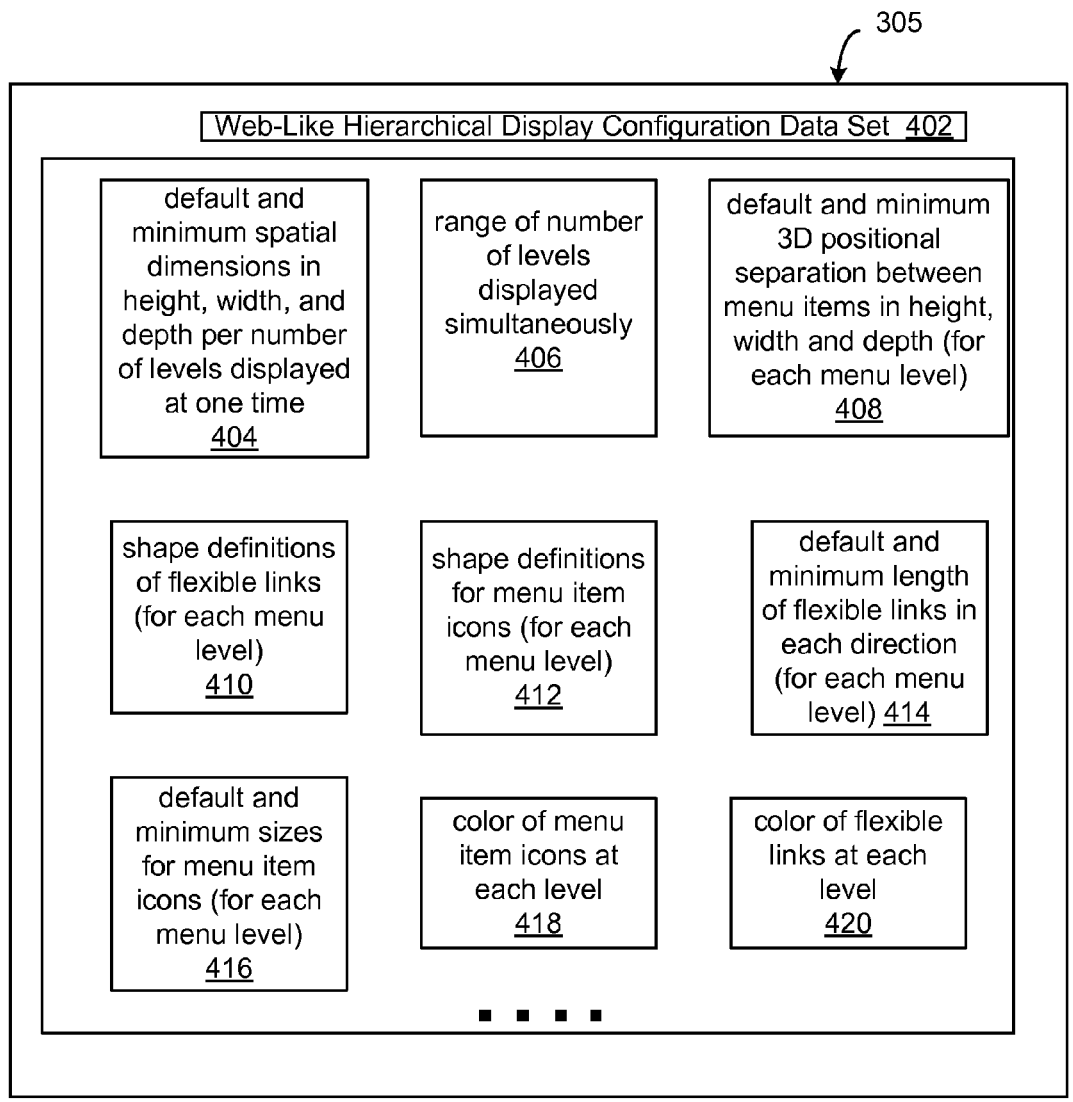
FIG. 5B illustrates an example of a web-like hierarchical display configuration data set illustrating examples of data items which may be used in embodiments of the technology.
Figure 5B:
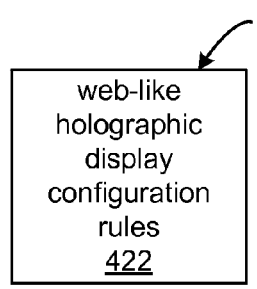
Figure 5C:
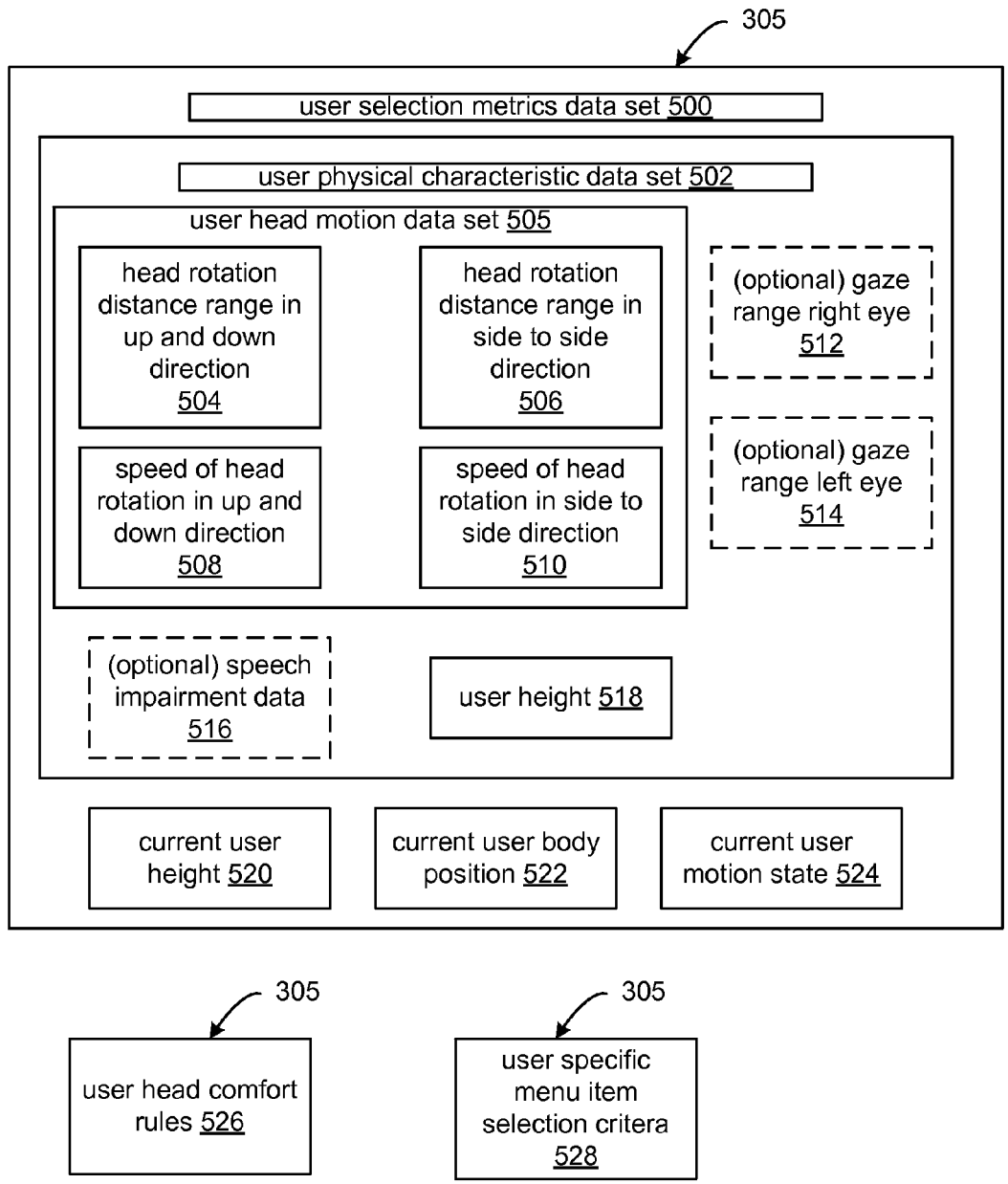
FIG. 5C illustrates an example of a user selection metrics data set illustrating examples of data items therein which may be used in embodiments of the technology.

FIGS. 5B and 5C illustrate some examples of data sets and rules which may be included in an embodiment of a web-like hierarchical menu interface display library 305.

FIG. 5B illustrates an example of a web-like hierarchical display configuration data set illustrating examples of data items which may be used in embodiments of the technology. Web-like hierarchical display configuration rules 422 are also illustrated as part of web-like hierarchical menu interface display library 305 and when executed by a processor enforce constraints defined in a web-like hierarchical display configuration data set 402 store for each display configuration.

Data stored for the web-like hierarchical display configurations comprise data identifying size, shape and distance ranges for different display menu elements. The data item examples illustrated for the configuration data set 402 are representative and are not meant to be all inclusive as indicated by the " . . . ." The data item examples illustrated are default and minimum spatial dimensions in height, width, and depth per number of levels displayed at one time 404. This may be for example identifying a size range of an overall display configuration for each number of levels displayed. Another example is a range of number of levels which can be displayed simultaneously 406. The next set of examples may be used when adapting display menu elements representing menu items in a menu. Default configuration data as well as minimum constraints are identified: default and minimum 3D positional separation between menu items in height, width and depth (for each menu level) 408, shape definitions of flexible links (for each menu level) 410, shape definitions for menu item icons (for each menu level) 412, default and minimum length of flexible links in each direction (for each menu level) 414, and default and minimum sizes for menu item icons (for each menu level) 416. Additionally, configuration data for aesthetic aspects of display menu elements may be provided such as the examples of color of menu item icons at each level 418 and color of flexible links at each level 420.

FIG. 5C illustrates an example of a user selection metrics data set illustrating examples of data items which may be embodied in the web-like hierarchical menu interface display library 305. User head comfort rules 526 and user specific menu item selection criteria 528 are applied based on data like that illustrated defined in the exemplary user selection metrics data set 500. Again, the data items illustrated are exemplary and not exhaustive, and all the data items identified may not be used by an embodiment of the technology.

The user selection metrics data set 500 includes an exemplary user physical characteristic data set 502, current user height 520, current user body position 522 and a current user motion state 524. A current user body position 522 may be determined based on data from the inertial sensing unit 132 alone or in combination with identifying user surroundings based on depth image data and 3D mapping of the user environment. Some examples of a body position are sitting, standing, leaning over and lying on one's back or side. There may be different ranges of head motion defined for different body positions. A current user height may be determined based on a user's stored height, e.g. standing height, and current body position. (User stored height may be determined based on the inertial sensing unit 132, alone or in combination with identifying a height of the NED based on its view of a 3D mapped user environment. For example, sitting height is much less than standing height. Current user motion state 524 may be used for interpreting user action when a user is moving toward a virtual menu tethered to a fixed point in a 3D mapping. Additionally, motion state may be used for safety reasons. For example, adjusting a position of the menu or closing the menu based on the user motion state so as not to interfere with a user's view of the real world.

User head motion data set 505 includes examples of data items tracked specifically for a user over time based on head orientation data generated by for example the accelerometer, gyroscope or both of the inertial sensing unit 132. In many examples, the user head comfort rules 526 apply there rules specifically for the user based on these data values in enforcing comfort criteria. The user head motion data set 505 includes head rotation distance range in up and down direction 504, head rotation distance range in side to side direction 506, speed of head rotation in up and down direction 508 and speed of head rotation in side to side direction 510.

Other physical characteristic data which may be stored includes optional gaze range right eye data 512, optional gaze range left eye data 514, and user height 518 data which is the user's standing height.

The user head comfort rules 526 may apply to a number of head based features. The rules 526 may have an ordered list of head positions by comfort, for example predetermined based on human factors or ergonomics data. For example, a center head position indicating the user head is level meaning unrotated and facing straight ahead may be identified as the most comfortable head position, at least for a sitting or standing body position. Additionally, one or more proportions of head rotation range and head rotation speed may be used for one or more thresholds indicating comfort levels. The rotation range and speed would preferably be those determined from measurements for the user. A time factor for holding a particular head position may also be used for determining a user comfort level.

A head based feature may also include eyes and a mouth for making sound. Comfort rules for gaze may apply to gaze angles used to activate an item and length of gaze. With respect to sound, level of volume, length of sound to be made could be comfort factors, and slowness or quickness of speech required.

The technology may be embodied in other specific forms without departing from the spirit or essential characteristics thereof. Likewise, the particular naming and division of modules, routines, applications, features, attributes, methodologies and other aspects are not mandatory, and the mechanisms that implement the technology or its features may have different names, divisions and/or formats.

For illustrative purposes, the method embodiments below are described in the context of the system and apparatus embodiments described above. Examples of the one or more processors referenced below are one or more processors of the NED system 8 (with or without the companion processing module 4) or one or more remote computer systems 12 or both. However, the method embodiments are not limited to operating in the system embodiments described above and may be implemented in other system embodiments. Furthermore, the method embodiments may be continuously performed while the NED system is in operation and an applicable application is executing.

Figure 6:
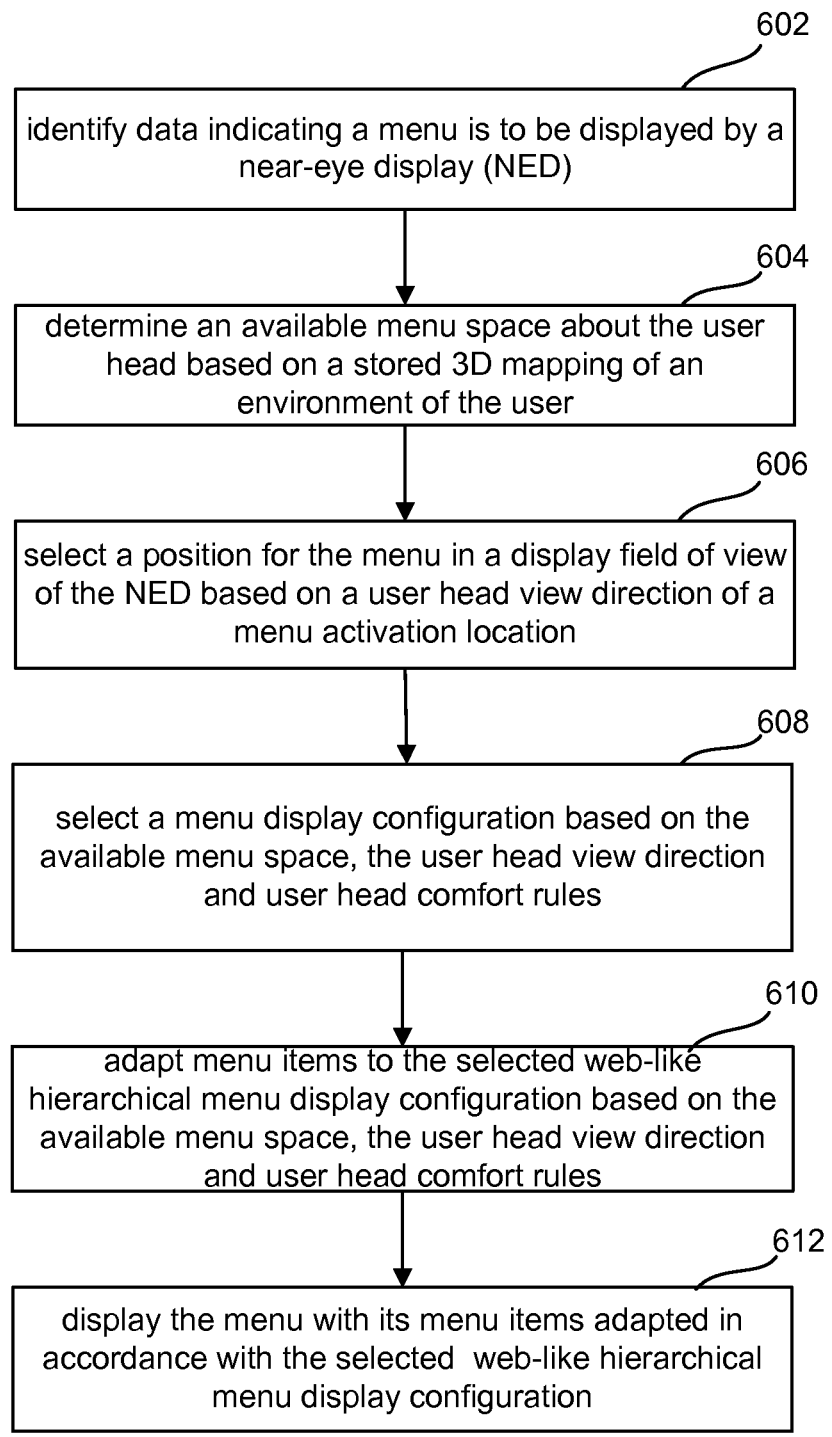
FIG. 6 is a flowchart of an embodiment of a method for determining a web-like hierarchical menu display configuration for displaying a menu by a near-eye display (NED).

FIG. 6 is a flowchart of an embodiment of a method for determining a web-like hierarchical display configuration for displaying a menu by a near-eye display (NED). The embodiment of the method comprises in step 602 identifying by one or more processors data indicating a menu is to be displayed by the near-eye display (NED). As mentioned above, the data may be that the scene mapping engine 306 has identified the menu activation location is located in the current display field of view. In step 604, an available menu space about the user head is determined by the one or more processors based on a stored three dimensional (3D) mapping of an environment of the user. For example, the one or more processors identify available menu space for displaying the menu in the web-like hierarchical display configuration based on at least one of the 3D mapping of the display field of view or a 3D mapping of the user environment.

In step 606, the one or more processors select a position for the menu in a display field of view of the NED based on a user head view direction of a menu activation location. Additionally, the position for the menu in the display field of view may be selected based on at least one of a user height or a current user height so the user sees the menu at a comfortable eye level.

In step 608, a web-like hierarchical menu display configuration is selected based on the available menu space, the user head view direction and user head comfort rules, and in step 610, menu items are adapted to the selected web-like hierarchical display configuration based on the available menu space, the user head view direction and user head comfort rules. As mentioned in the discussion for FIGS. 4A and 4B, some examples of adapting may include adapting a size of menu items in at least one menu level displayed simultaneously and adapting a number of menu levels displayed simultaneously based on the available menu space. In step 612, the one or more processors cause the image generation unit 120 to display the menu with its menu items adapted in accordance with the selected web-like hierarchical display configuration.

As discussed further below, the head view direction and available menu space are continuously monitored during display of the menu for determining whether to change the menu display layout. For example, monitoring of the head view direction and head position may indicate a user head position is rotating further away from a center head position. To avoid discomfort for the user, the displayed distance between menu levels may be decreased.

Figure 7:
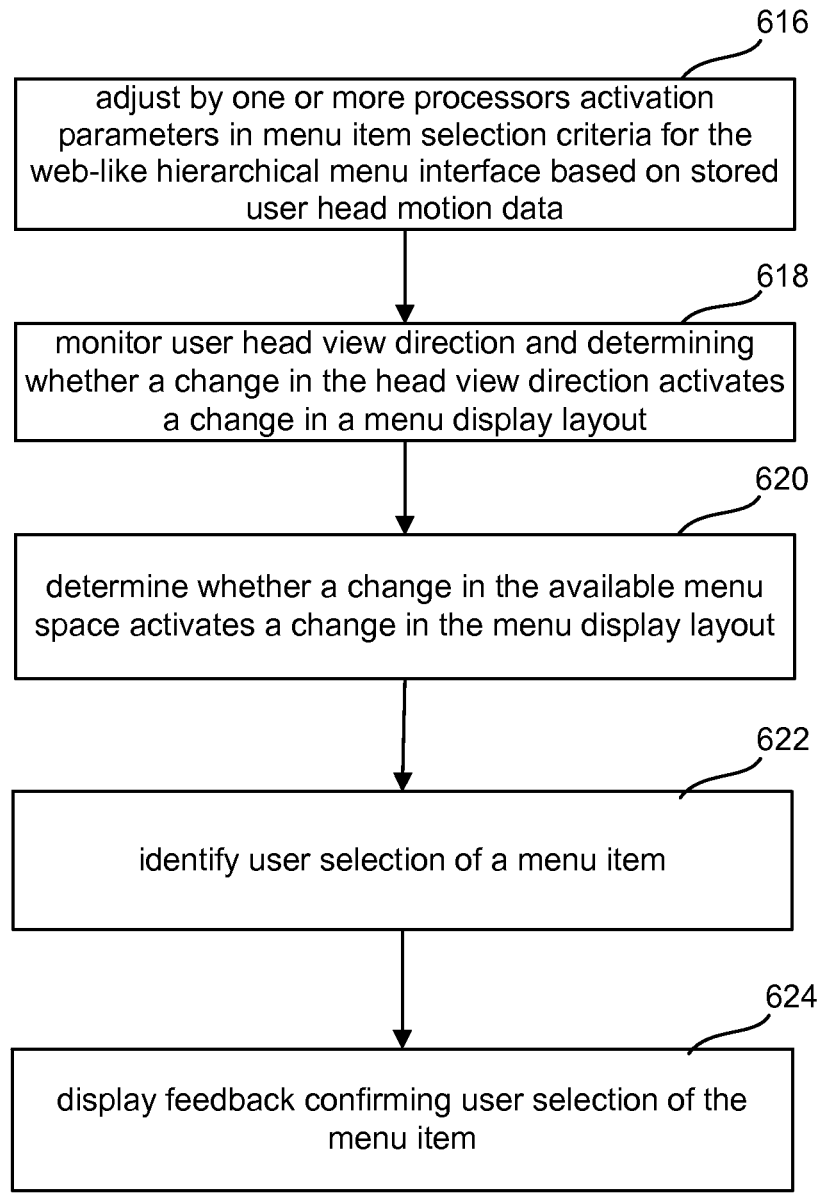
FIG. 7 is a flowchart of an embodiment of a method for adapting activation of a web-like hierarchical menu interface being executed by one or more processors of a near-eye display (NED) system based on user selection metrics.

FIG. 7 is a flowchart of an embodiment of a method for adapting activation of a web-like hierarchical menu interface being executed by one or more processors of a near-eye display (NED) system based on user selection metrics. The embodiment of the method comprises in step 616 adjusting by one or more processors activation parameters in menu item selection criteria for the web-like hierarchical menu interface based on stored user head motion data. The one or more processors in step 618 monitor head view direction and determine whether a change in the head view direction activates a change in a menu display layout. In step 620, the one or more processors determine whether a change in the available menu space activates a change in the menu display layout. In step 622, user selection of a menu item is identified, for example by identifying natural user input based on data from sensors on the NED system like an eye tracking system 134, the inertial sensing unit 132 and the depth cameras 113. The NED system displays feedback confirming user selection of the menu item in step 624.

Figure 8:
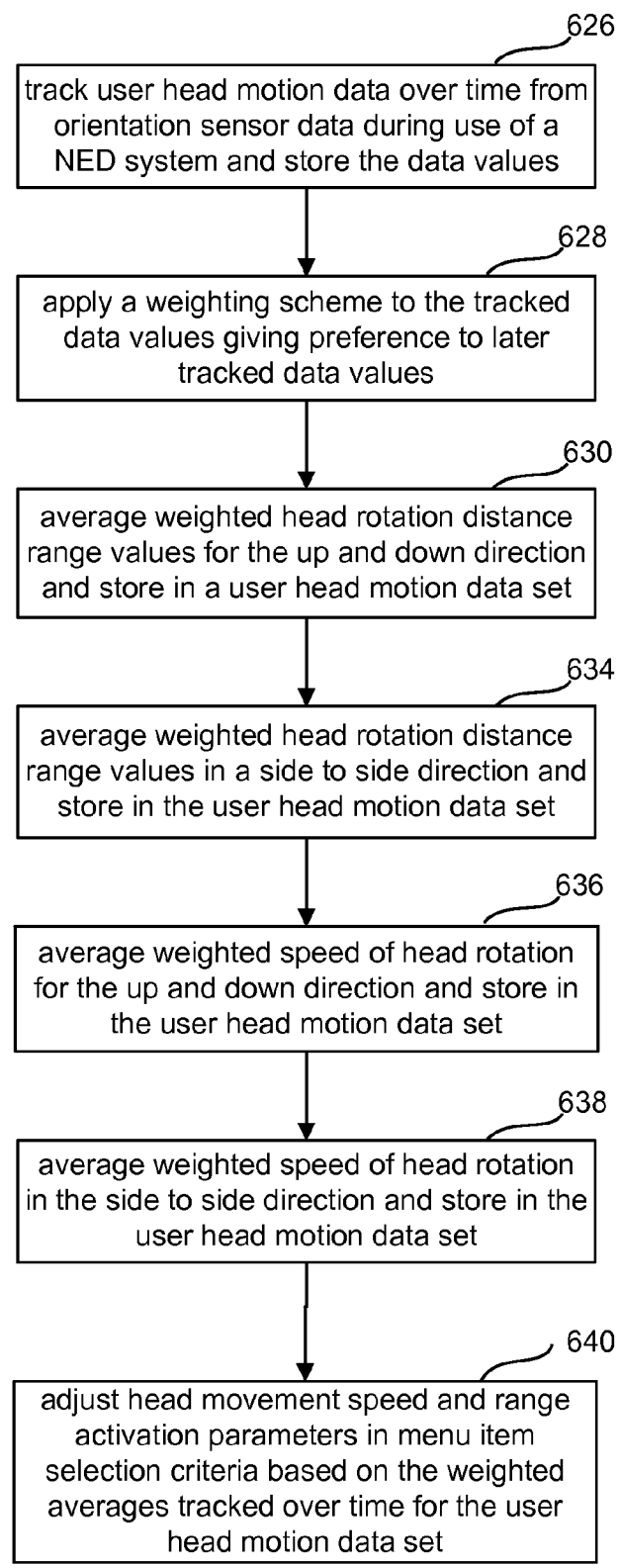
FIG. 8 is a flowchart of an embodiment of a process for adapting activation parameters for selecting a menu selection from a web-like hierarchical menu based on user head motion data.

FIG. 8 is a flowchart of an embodiment of a process for adapting activation parameters for selecting a menu selection from a web-like hierarchical menu based on user head motion data. In step 626, the one or more processors track user head motion data over time from orientation sensor data during use of a NED system and store the data values. In 628, a weighting scheme is applied to the tracked data values giving preference to later tracked data values.

In steps 630, 634, 636 and 638, each of the weighted head rotation distance range values for the up and down direction, average weighted head rotation distance range values in a side to side direction, average weighted speed of head rotation for the up and down direction, and average weighted speed of head rotation in the side to side direction are averaged and stored in a user head motion data set.

In step 640, head movement speed and range activation parameters are adjusted in menu item selection criteria based on the weighted averages tracked over time for the user head motion data set to generate user-specific menu item selection criteria.

Figure 9:
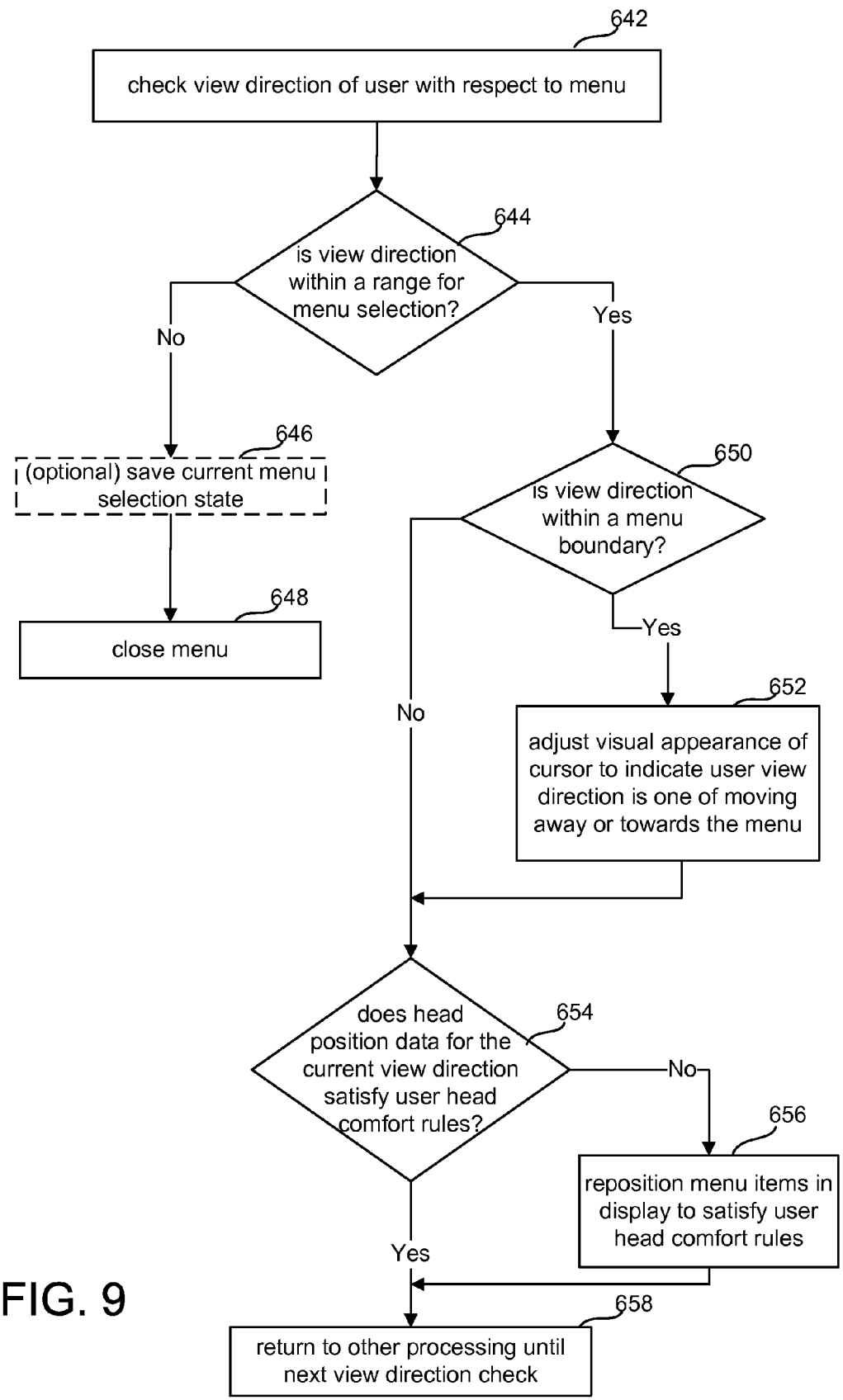
FIG. 9 is a flowchart of an embodiment of a method for monitoring head view direction and determining whether a change in the head view direction activates a change in a menu layout.

FIG. 9 is a flowchart of an embodiment of a method for monitoring head view direction and determining whether a change in the head view direction activates a change in a menu layout. The embodiment of the method comprises in step 642, checking view direction of user with respect to menu, for example checking menu position in the NED field of view based on the depth images captured by the front depth cameras 113. In step 644, it is determined whether the view direction is within a range for menu selection. The user's view direction is likely to move around a bit just due to normal user head motion. Additionally, some confirmation of selection actions may cause the user to change his view angle or direction to the menu. In some examples, range of menu selection criteria may be based on a percentage of the displayed menu being in the display field of view within a time period. This can be an indicator that the user is still engaging with the menu.

Responsive to the view direction not being within the range for menu selection, in step 648, the menu is closed. This is to prevent unintended menu selections. Optionally, the current menu selection state can be saved in step 646 in case the user comes back within a predetermined time. Then, the user can traverse the hierarchical menu where she left off. In step 650, responsive to the view direction being within the range for menu selection, determining whether the view direction is within a menu boundary range. A menu boundary may be an edge of a menu display configuration. Responsive to the view direction being within the menu boundary, in step 652, adjusting the visual appearance of a cursor to indicate user head view direction is one of moving away or towards the menu. For example, as a user view direction gets too near an edge, the cursor fades, and as he or she returns user head view direction towards the menu, the cursor brightens.

Sensor data from the inertial sensing unit 132 provides orientation data and acceleration data from which head position data and head movement data can be determined. Additionally, the one or more processors in step 654 determine whether user head position data for the current head view direction satisfies user head comfort rules, and responsive to the user head comfort rules not being satisfied, in step 656 repositions the menu items for satisfying the user head comfort rules. If the rules are satisfied, the one or more processors in step 658 return to other processing until the next head view direction check.

The repositioning of menu items in step 656 may comprise altering a current web-like display configuration or selecting a new web-like display configuration as in the examples of FIGS. 4A and 4B. For example in FIG. 4A, if a current user head position does not satisfy user head comfort rules, currently unselected menu items may be moved in a depth direction away from the NED in a display field of view of the NED and display locations of menu items of a currently user selected menu level moved to a position in a 3D mapping of the user environment at which the user view direction can be from a center head position.

Figure 10:
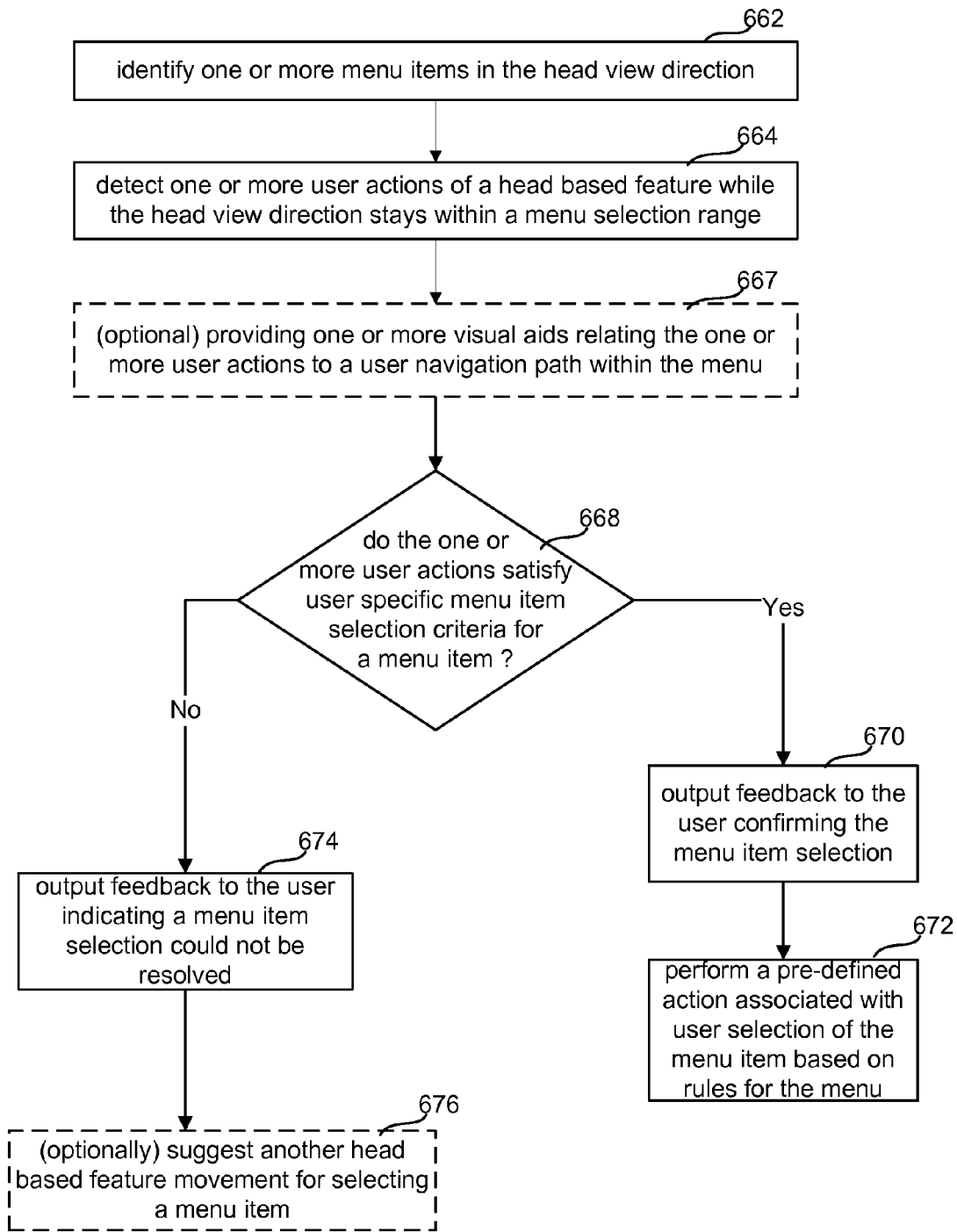
FIG. 10 is a flowchart of an embodiment of method for identifying user selection of a menu item.

FIG. 10 is a flowchart of an embodiment of method for identifying user selection of a menu item. The embodiment of the method comprises in step 662 identifying one or more menu items in the head view direction based on a 3D mapping of the display field of view of the NED and in step 664, detecting one or more user actions of a head based feature while the head view direction stays within a menu selection range. An example of head based features are the head or the eyes.

In step 667, optionally, one or more visual aids can be displayed relating the one or more user actions to a user navigation path within the menu. In step 668, the one or more processors determine whether the one or more user actions satisfy user specific menu item selection criteria for a menu item. In step 668, the one or more processors determine whether the one or more user actions satisfy user specific menu item selection criteria.

The following example illustrates detecting one or more user actions of a head based feature while the head view direction stays within a menu selection range and determining whether the one or more user actions satisfy user specific menu item selection criteria for natural user input in terms of head view direction and head position.

The one or more processors track changes to the user head view direction based on updates to the 3D mapping of the display field of view and correlating tracked user head view directions to the currently displayed menu items by identifying positions of the menu items in the NED field of view. The one or more processors determine whether a user head view direction has been maintained with respect to one of the currently displayed menu items satisfying a selection candidate time period stored in user-specific menu item selection criteria. Responsive to the selection candidate time period being satisfied, the one or more processors display a visual aid to the user indicating that the one of the currently displayed menu items is a selection candidate. Based on head orientation data determined from sensor data from an inertial sensing unit of the NED system, the one or more processors determine whether a selection confirmation head movement indicated by a head position change has occurred within a confirmation time period which may coincide with the selection candidate time period stored in user-specific menu item selection criteria or start after completion of the selection candidate time period.

In step 670, responsive to the one or more user actions satisfying user specific menu item selection criteria, the NED system outputs feedback by the near-eye display system confirming selection of the menu item. The feedback may be audio through audio output devices 130, visual data displayed by the NED or audiovisual data. In step 672, the one or more processors cause the NED system to perform a pre-defined action associated with user selection of the menu item based on rules for the menu. The pre-defined action and rules for the menu may be defined by the application providing the menu content.

If step 674, responsive to the one or more user actions not satisfying user specific menu item selection criteria, feedback may be output to the user indicating a menu item selection could not be resolved, and optionally in step 676, another head based feature movement for selecting a menu item such as gaze may be suggested to the user. Another option, if the available menu space permits is to expand the displayed configuration by increasing size of menu items or separation of menu items, either by distance or angle or choose another configuration which has increased separation between menu items or bigger items.

Figure 11:
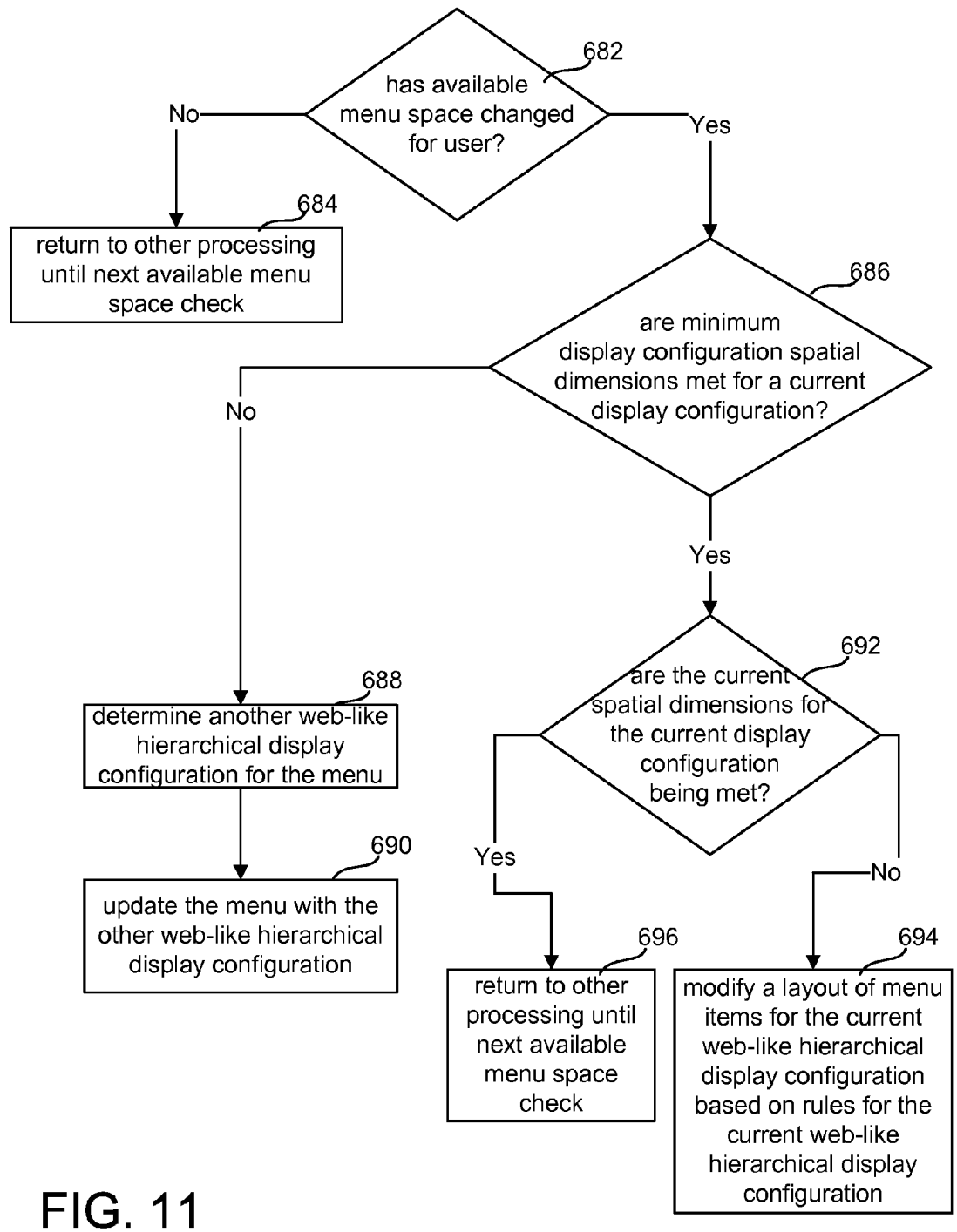
FIG. 11 is a flowchart of an embodiment of a method for adjusting a menu display configuration based upon a change in available menu space.

FIG. 11 is a flowchart of an embodiment of a method for determining whether a change in the available menu space activates a change in the menu display layout. The embodiment of the method comprises in step 682, determining whether available menu space has changed for the user. Responsive to the available menu space not having changed for the user, in step 684, the one or more processors return to other processing until a next available menu space check. Responsive to the available menu space having changed for the user, in step 686 determining whether the minimum display configuration spatial dimensions are met for a current web-like hierarchical display configuration.

In step 688, responsive to the minimum display configuration spatial dimensions not being met for the current web-like hierarchical display configuration, the one or more processors determine another web-like hierarchical display configuration for the menu and update the menu with the other web-like hierarchical display configuration in step 690.

Responsive to the minimum display configuration spatial dimensions being met, in step 692, the one or more processors determine whether the current web-like hierarchical display configuration spatial dimensions are being met. If so, the one or more processors return to other processing until a next available menu space check in step 696. Responsive to the current web-like hierarchical display configuration spatial dimensions not being met, in step 694, the one or more processors modify a layout of menu items for the current display configuration based on the web-like hierarchical display configuration rules 422 for the current display configuration.

Figure 12:
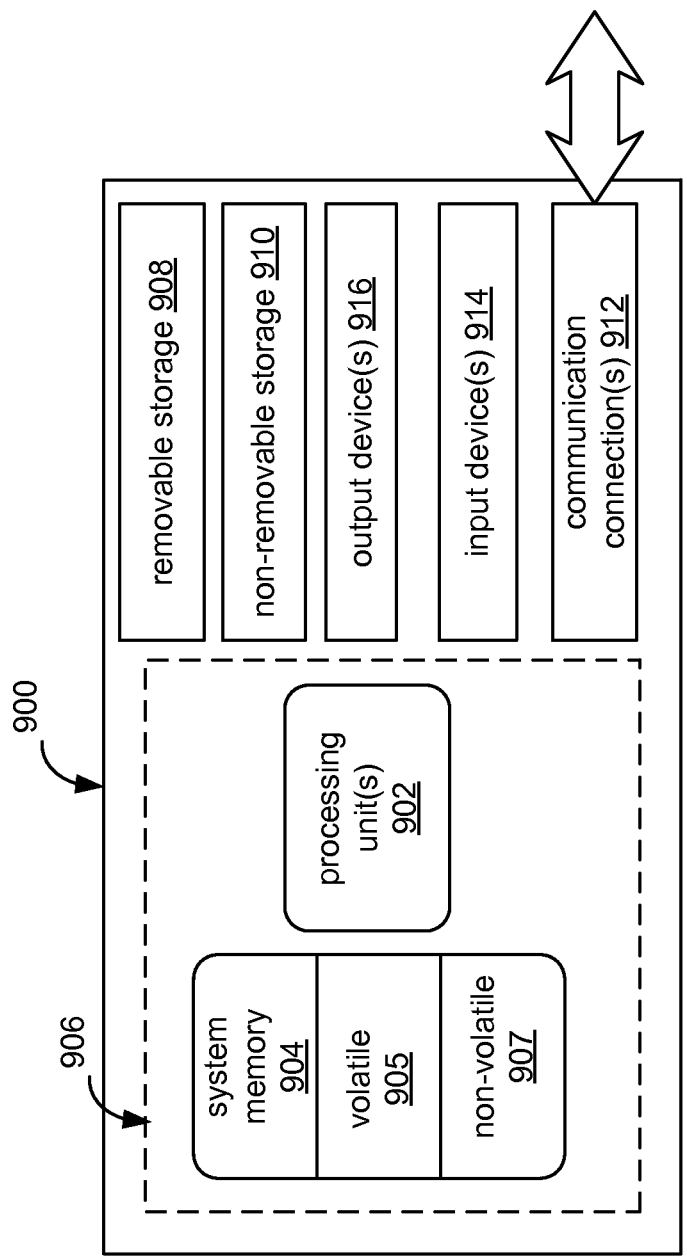
FIG. 12 is a block diagram of one embodiment of a computing system that can be used to implement a network accessible computing system, a companion processing module or control circuitry of a near-eye display device.

FIG. 12 is a block diagram of one embodiment of a computer system that can be used to implement a network accessible computing system 12, a companion processing module 4, or another embodiment of control circuitry 136 of a near-eye display (NED) device which may host at least some of the software components of computing environment 54. The complexity and number of components may vary considerably for different embodiments of the computer system 12, the control circuitry 136 and the companion processing module 4. FIG. 12 illustrates an exemplary computer system 900. In its most basic configuration, computing system 900 typically includes one or more processing units 902 including one or more central processing units (CPU) and one or more graphics processing units (GPU). Computer system 900 also includes memory 904. Depending on the exact configuration and type of computer system, memory 904 may include volatile memory 905 (such as RAM), non-volatile memory 907 (such as ROM, flash memory, etc.) or some combination of the two. This most basic configuration is illustrated in FIG. 12 by dashed line 906. Additionally, computer system 900 may also have additional features/functionality. For example, computer system 900 may also include additional storage (removable and/or non-removable) including, but not limited to, magnetic or optical disks or tape. Such additional storage is illustrated in FIG. 12 by removable storage 908 and non-removable storage 910.

Computer system 900 may also contain communication module(s) 912 including one or more network interfaces and transceivers that allow the device to communicate with other computer systems. Computer system 900 may also have input device(s) 914 such as keyboard, mouse, pen, voice input device, touch input device, etc. Output device(s) 916 such as a display, speakers, printer, etc. may also be included.

The example computer systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a web-like hierarchical display configuration for displaying a menu by a near-eye display (NED) comprising:
    identifying by one or more processors data indicating a menu is to be displayed by the near-eye display (NED);
    determining an available menu space about a user head and a user head view direction by the one or more processors based on a stored three dimensional (3D) mapping of an environment of the user;
    selecting by the one or more processors a position for the menu in a display field of view of the NED based on the user head view direction of a menu activation location;
    selecting a web-like hierarchical menu display configuration based on the available menu space, the user head view direction and user head comfort rules, the web-like hierarchical menu display configuration links menu levels and menu items within a menu level with flexible spatial dimensions for menu elements;
    adapting menu items to the selected web-like hierarchical menu display configuration based on changes in the available menu space based on objects surrounding the user, the user head view direction and user head comfort rules including head rotation range and head rotation speed as an indicator of a level of head comfort; and
    displaying the menu with its menu items connected using a flexible link configurable to be linear and non-linear and is adapted in accordance with the selected web-like hierarchical menu display configuration.

2. The method of claim 1 wherein adapting menu items to the selected web-like hierarchical display configuration based on the available menu space, the user head view direction and user head comfort rules further comprising at least one of:
    adapting a size of menu items in at least one menu level displayed simultaneously based on the available menu space; and
    adapting a number of menu levels displayed simultaneously based on the available menu space.

3. The method of claim 1 wherein selecting by the one or more processors a position for the menu in a display field of view of the NED based on a user head view direction of a menu activation location further comprises:
    selecting the position for the menu in the display field of view based on at least one of a user height or a current user height.

4. The method of claim 1 further comprising:
    monitoring head view direction for activating a change in a menu display layout.

5. The method of claim 4 wherein monitoring head view direction for activating a change in a menu display layout activating a change in a menu display layout further comprises:
    responsive to monitoring head view direction indicating a user head position is rotating further away from a center head position, decreasing a displayed distance between the menu levels.

6. The method of claim 1 wherein selecting the web-like hierarchical menu display configuration based on the available menu space, the user head view direction and user head comfort rules further comprises:
    displaying the web-like hierarchical display configuration with the flexible links for connecting the menu items;
    identifying the available menu space has more space in a vertical direction than a horizontal direction with respect to the user head view direction;
    selecting the web-like hierarchical menu display configuration including the flexible links for display in which the flexible links connect the menu items within a menu level in a zigzag pattern positioning the menu items back and forth in a first side direction up to a first side width boundary and then in a second side direction up to a second side width boundary within a predetermined vertical height range.

7. The method of claim 4 further comprising:
    responsive to a change in the menu display layout being activated due to a user head view direction of the menu item indicating a current user head position does not satisfy user head comfort rules, moving currently unselected menu items in a depth direction away from the NED in a display field of view of the NED and moving display locations of the menu items of a currently user selected menu level to a position in a 3D mapping of the user environment at which the user view direction can be from a center head position.

8. A method for adapting activation of a web-like hierarchical menu interface being executed by one or more processors of a near-eye display (NED) system based on user selection metrics comprising:
    adjusting by one or more processors activation parameters in menu item selection criteria for the web-like hierarchical menu interface based on stored user head motion data tracked over time and applying a weighting scheme to later tracked data values of the tracked data;
    monitoring head view direction and determining whether a change in the head view direction activates a change in a menu display layout;
    determining whether a change in the available menu space activates a change in the menu display layout;
    identifying user selection of a menu item and adjusting the menu item selection criteria based on the weighted averages tracked over time for the user head motion data to generate user specific menu item selection criteria; and
    displaying feedback confirming user selection of the menu item.

9. The method of claim 8 wherein identifying user selection of a menu item further comprises:
    identifying one or more menu items in the head view direction based on a 3D mapping of display field of view of the NED;
    detecting one or more user actions of a head based feature while the head view direction stays within a menu selection range;
    providing one or more visual aids relating the one or more user actions to a user navigation path within the menu;

determining whether the one or more user actions satisfy the user specific menu item selection criteria for a menu item; and responsive to the one or more user actions satisfying the user specific menu item selection criteria, outputting feedback by the near-eye display system confirming selection of the menu item.

10. The method of claim 8 wherein the user head motion data comprises a head rotation distance range for an up and down direction, a head rotation distance range for a side to side direction, a speed of head rotation in an up and down direction and a speed of head rotation in a side to side direction.

11. The method of claim 9 wherein the one or more visual aids relating the one or more user actions to a user navigation path within the menu comprise a cursor for navigating the web-like hierarchical menu interface.

12. The method of claim 9 wherein detecting the one or more user actions of a head based feature while the head view direction stays within a menu selection range and determining whether the one or more user actions satisfy the user specific menu item selection criteria for the one or more menu items further comprises:

tracking changes to the user head view direction based on updates to the 3D mapping of the display field of view;

correlating user head view directions to the currently displayed menu items by identifying positions of the menu items in the NED field of view;

determining whether a user head view direction has been maintained with respect to one of the currently displayed menu items satisfying a selection candidate time period stored in user-specific menu item selection criteria;

responsive to the selection candidate time period being satisfied, displaying a visual aid to the user indicating that the one of the currently displayed menu items is a selection candidate; and based on head orientation data determined from sensor data from an inertial sensor of the NED system, determine whether a selection confirmation head movement indicated by a head position change has occurred within a confirmation time period stored in user-specific menu item selection criteria.

13. The method of claim 8 wherein monitoring head view direction and determining whether a change in the head view direction activates a change in a menu display layout further comprises:

checking view direction of user with respect to menu;

determining whether view direction is within a range for menu selection;

responsive to the view direction not being within the range for menu selection, closing the menu;

responsive to the view direction being within the range for menu selection, determining whether the view direction is within a menu boundary range;

responsive to the view direction being within a menu boundary, adjusting the visual appearance of a cursor to indicate user head view direction is one of moving away from the menu or towards the menu;

determining whether user head position data for the current head view direction satisfies user head comfort rules; and responsive to the user head comfort rules not being satisfied, repositioning the menu items for satisfying the user head comfort rules.

14. The method of claim 8 wherein determining whether a change in the available menu space activates a change in the menu display layout further comprises:

determining whether the available menu space has changed for the user;

responsive to the available menu space having changed for the user determining whether a minimum display configuration spatial dimensions are met for a current web-like hierarchical display configuration;

responsive to the minimum display configuration spatial dimensions not being met for the current web-like hierarchical display configuration, determining another web-like hierarchical display configuration for the menu and updating the menu with the other web-like hierarchical display configuration;

responsive to the minimum display configuration spatial dimensions being met for the current web-like hierarchical display configuration, determine whether the current spatial dimension requirements are being met for the current web-like hierarchical display configuration; and responsive to the current spatial dimensions not being met for the current web-like hierarchical display configuration, modifying a layout of menu items for the current web-like hierarchical display configuration based on web-like hierarchical display configuration rules for the current web-like hierarchical display configuration.

15. The method of claim 9 wherein providing one or more visual aids relating the one or more user actions to a user navigation path within the menu further comprises:

the web-like hierarchical display configuration includes flexible links displayed for connecting menu items;

displaying by the near-eye display under control of the one or more processors cursor movement along one of the flexible links indicating progress in selecting one of the menu items with at least one of a head movement or a gaze action.

16. A near-eye display (NED) system for displaying a web-like hierarchical menu display configuration comprising:

a near-eye support structure;

a near-eye display (NED) supported by the near-eye support structure and having a field of view;

an image generator supported by the near-eye support structure to output image data for display by the near-eye display (NED); and one or more processors having access to a memory storing web-like hierarchical menu display configurations and web-like hierarchical menu display configurations rules, and being communicatively coupled to the image generator to control display of a menu in accordance with one of the web-like hierarchical menu display configurations and user head comfort rules such that the image generator controls the web-like hierarchical menu display configurations to connect menu levels with a flexible link configurable as an arc and a line which are displayed on the NED and navigable using a visual aid to traverse along a link pathway.

17. The near-eye display (NED) system of claim 16 further comprising:

at least one image capture device supported by the near-eye support structure for capturing image data and depth data of real objects in the field of view of the NED;

the one or more processors being communicatively coupled to the at least one image capture device for receiving the image and depth data and determining a three dimensional mapping of the display field of view;

the one or more processors determining a user head view direction of a user when wearing the NED system with respect to a menu position in the display field of view and identifying one or more menu items in the user head view direction;

the one or more processors processing sensor data from one or more sensors supported by the near-eye support for detecting one or more user actions of a head based feature; and the one or more processors determining which of the one or more menu items in the user head view direction has been selected based on the identified user actions of the head based feature.

18. The near-eye display (NED) system of claim 17 further comprising:

at least one of the user actions of the head based feature is a change in head position; and the one or more sensors supported by the near-eye support includes an inertial sensor providing orientation data from which head position data is determined.

19. The near-eye display (NED) system of claim 17 further comprising:

the one or more processors identifying available menu space for displaying the menu in the web-like hierarchical menu display configuration based on at least one of the 3D mapping of the display field of view or a 3D mapping of the user environment.

20. The near-eye display (NED) system of claim 18 wherein the user head comfort rules are defined in terms of head position data, and the stored web-like hierarchical menu display configurations include data identifying size, shape and distance ranges for different display menu elements.

* * * * *